(12) United States Patent
Bhuiyan

(10) Patent No.: US 12,502,072 B1
(45) Date of Patent: Dec. 23, 2025

(54) SYSTEMS AND METHODS FOR AUTOMATED HYPERTENSIVE RETINOPATHY (HTNR) DETECTION

(71) Applicant: iHealthScreen Inc., Queens Village, NY (US)

(72) Inventor: Alauddin Bhuiyan, Queens Village, NY (US)

(73) Assignee: IHEALTHSCREEN INC., Queens Village, NY (US)

(*) Notice: Subject to any disclaimer, the term of this patent is extended or adjusted under 35 U.S.C. 154(b) by 0 days.

(21) Appl. No.: 19/052,791

(22) Filed: Feb. 13, 2025

Related U.S. Application Data

(60) Provisional application No. 63/736,964, filed on Dec. 20, 2024.

(51) Int. Cl.
- *A61B 3/12* (2006.01)
- *A61B 3/00* (2006.01)

(Continued)

(52) U.S. Cl.
CPC .......... *A61B 3/1241* (2013.01); *A61B 3/0025* (2013.01); *G06T 7/0012* (2013.01);
(Continued)

(58) Field of Classification Search
CPC . G06T 2207/30041; G06T 2207/10024; G06T 7/0012; G06T 7/0014;
(Continued)

(56) References Cited

U.S. PATENT DOCUMENTS

| | | | |
|---|---|---|---|
| 2007/0081699 A1* | 4/2007 | Avinash | G06T 7/0012 382/128 |
| 2016/0166141 A1* | 6/2016 | Kanagasingam | A61B 3/12 351/246 |

(Continued)

OTHER PUBLICATIONS

Abbas, Qaisar, Imran Qureshi, and Mostafa EA Ibrahim. "An automatic detection and classification system of five stages for hypertensive retinopathy using semantic and instance segmentation in DenseNet architecture." Sensors 21.20 (2021): 6936. (Year: 2021).*

(Continued)

*Primary Examiner* — Courtney Joan Nelson
(74) *Attorney, Agent, or Firm* — George Likourezos; Carter, DeLuca & Farrell LLP

(57) ABSTRACT

A system for hypertensive retinopathy (HTNR) detection includes a processor and a memory, including instructions stored thereon, which when executed by the processor, cause the system to: preprocess a retinal image using contrast enhancement, noise reduction and/or resolution normalization; segment a plurality of vessels from the preprocessed retinal image to generate a vessel segmentation map; detect a retinal marker, a vascular marker and/or an optic disc marker in the preprocessed retinal image using a first machine learning model; generate a severity score based on the detections; determine that the severity score exceeds a predefined threshold; and generate an output indicating a presence of HTNR based on the vessel segmentation map and the severity score using a second machine learning model.

20 Claims, 16 Drawing Sheets

(51) Int. Cl.
　　　*G06T 7/00*　　　(2017.01)
　　　*G06T 7/11*　　　(2017.01)
(52) U.S. Cl.
　　　CPC ...... *G06T 7/11* (2017.01); *G06T 2207/20072* (2013.01); *G06T 2207/20081* (2013.01); *G06T 2207/20084* (2013.01); *G06T 2207/30041* (2013.01); *G06T 2207/30101* (2013.01)
(58) Field of Classification Search
　　　CPC . G06T 2207/30096; G06T 2207/30104; G06T 2207/20081; G06T 7/11; G06T 2207/30101; G06T 2207/20084; G06T 7/12; G06T 7/13; G06T 2207/20072; A61B 3/12; A61B 3/0025; A61B 3/14; A61B 3/1241; A61B 5/14555; A61B 8/10; A61B 2576/02; A61B 3/1233; G16H 50/20; G16H 30/20; G06N 3/045; G06N 3/08
　　　See application file for complete search history.

(56) References Cited

U.S. PATENT DOCUMENTS

2022/0319708 A1* 10/2022 Hart ................ G06T 7/0012
2024/0130669 A1* 4/2024 Nguyen ............ G06N 3/0455

OTHER PUBLICATIONS

Erwin, R. Zulfahmi, D. S. Noviyanti, G. R. Utami, A. N. Harison and P. S. Agung, "Improved Image Quality Retinal Fundus with Contrast Limited Adaptive Histogram Equalization and Filter Variation," 2019 International Conference on Informatics, Multimedia, Cyber and Information System (ICIMCIS), Jakarta (Year: 2019): Indonesia, 2019, pp. 49-54, doi: 10.1109/ICIMCIS48181.2019.8985198. (Year: 2019).*

J. Staal, M. D. Abramoff, M. Niemeijer, M. A. Viergever and B. van Ginneken, "Ridge-based vessel segmentation in color images of the retina," in IEEE Transactions on Medical Imaging, vol. 23, No. 4, pp. 501-509, Apr. 2004, doi: 10.1109/TMI.2004.825627 (Year: 2004).*

Sven Holm, Greg Russell, Vincent Nourrit, Niall McLoughlin, "Dr Hagis—a fundus image database for the automatic extraction of retinal surface vessels from diabetic patients," J. Med. Imag. 4(1) 014503 (Feb. 9, 2017) (Year: 2017).*

Tan, Mingxing, et al. "EfficientNet: Rethinking Model Scaling for Convolutional Neural Networks", In International conference on machine learning, pp. 1-11, Sep. 11, 2020.

Harold G. Scheie, M.D., "Evaluation of Ophthalmoscopic Changes of Hypertension and Arteriolar Sclerosis", AMA archives of ophthalmology, 49(2), pp. 117-138, Feb. 1953.

* cited by examiner

1300

1400

SYSTEMS AND METHODS FOR AUTOMATED HYPERTENSIVE RETINOPATHY (HTNR) DETECTION

CROSS-REFERENCE TO RELATED APPLICATION AND CLAIM OF PRIORITY

This application claims the benefit of, and priority to, U.S. Provisional Patent Application No. 63/736,964, filed on Dec. 20, 2024, the entire contents of which are hereby incorporated herein by reference.

GOVERNMENT SUPPORT

The subject matter of this disclosure was supported by the National Institutes of Health Small Business Innovation Research (NIH SBIR)—Grant No. 2R44EY031202-04A1.

TECHNICAL FIELD

The present application relates to systems and methods for automated hypertensive retinopathy (HTNR) detection, and, more specifically, to a system and method for automated HTNR detection using color fundus imaging and deep learning techniques.

BACKGROUND

Hypertensive retinopathy (HTNR) is a retinal condition caused by elevated blood pressure, which is marked by vascular changes that can lead to severe visual impairment if not identified and treated early. For example, HTNR typically puts stress on retinal blood vessels, causing them to thicken, narrow, or even burst. Thus, HTNR can lead to vision problems and, if untreated, severe visual impairment. Diagnosing hypertensive retinopathy early is essential to take preventative measures. Traditional diagnostic approaches for HTNR rely on expert examination of retinal fundus images, making the process labor-intensive, subjective, and/or highly dependent on the clinician's experience.

Accordingly, there is a need for improved systems and methods for HTNR detection.

SUMMARY

In accordance with aspects of the present disclosure, a system for hypertensive retinopathy (HTNR) detection includes a processor and a memory, including instructions stored thereon, which when executed by the processor, cause the system to: preprocess a retinal image using contrast enhancement, noise reduction, and/or resolution normalization; segment a plurality of vessels from the preprocessed retinal image to generate a vessel segmentation map; detect a retinal marker, a vascular marker, and/or an optic disc marker in the preprocessed retinal image using a first machine learning model; generate a severity score based on the detections; determine that the severity score exceeds a predefined threshold; and generate an output indicating a presence of HTNR based on the vessel segmentation map and the severity score using a second machine learning model.

In an aspect of the present disclosure, the retinal marker may indicate a microaneurysm, an exudate, a cotton wool spot, a hemorrhage, and/or a Hollenhorst plaque.

In another aspect of the present disclosure, the instructions, when executed by the processor, may further cause the system to receive the retinal image from a screening device. The retinal image may include a fundus image of a patient.

In yet another aspect of the present disclosure, preprocessing the retinal image may include applying contrast-limited adaptive histogram equalization (CLAHE) and Gaussian filtering.

In a further aspect of the present disclosure, segmenting the plurality of vessels from the preprocessed retinal image may include using a convolutional neural network (CNN) with contracting and expanding paths for segmentation.

In yet a further aspect of the present disclosure, the CNN may include a modified U-Net architecture trained on annotated retinal fundus images.

In an aspect of the present disclosure, the instructions, when executed by the processor, may further cause the system to: extract a region of interest (ROI) from the vessel segmentation map; and detect a presence of the vascular marker in the extracted ROI using the first machine learning model, the vascular marker indicating arteriovenous nicking (AVN), focal narrowing (FN), central arteriolar light reflex (CAR), central light reflex (CRR), and/or or arteriolar wall opacification.

In another aspect of the present disclosure, the instructions, when executed by the processor, further cause the system to: identify an optic disc region in the preprocessed retinal image; and detect a presence of the optic disc marker in the optic disc region using the first machine learning model, the optic disc-marker indicating papilledema.

In a yet another aspect of the present disclosure, the instructions, when executed by the processor, further cause the system to: generate a preliminary score for each detection using a neural network; and integrate the preliminary scores to generate the severity score.

In a further aspect of the present disclosure, the instructions, when executed by the processor, may further cause the system to pretrain the first machine learning model and/or the second machine learning model using a dataset including fundus images associated with at least ten retinal conditions.

In accordance with aspects of the present disclosure, a method for hypertensive retinopathy (HTNR) detection includes: preprocessing a retinal image using at least one of contrast enhancement, noise reduction, or resolution normalization; segmenting a plurality of vessels from the preprocessed retinal image to generate a vessel segmentation map; detecting a retinal marker, a vascular marker, and/or an optic disc marker in the preprocessed retinal image using a first machine learning model; generating a severity score based on the detections; determining that the severity score exceeds a predefined threshold; and generating an output indicating a presence of HTNR based on the vessel segmentation map and the severity score using a second machine learning model.

In an aspect of the present disclosure, the retinal marker may indicate a microaneurysm, an exudate, a cotton wool spot, a hemorrhage, and/or a Hollenhorst plaque.

In another aspect of the present disclosure, preprocessing the retinal image may include applying contrast-limited adaptive histogram equalization (CLAHE) and Gaussian filtering.

In yet another aspect of the present disclosure, segmenting the plurality of vessels from the preprocessed retinal image may include using a convolutional neural network (CNN) with contracting and expanding paths for segmentation.

In a further aspect of the present disclosure, the CNN may include a modified U-Net architecture trained on annotated retinal fundus images.

In yet a further aspect of the present disclosure, the method may further include: extracting a region of interest (ROI) from the vessel segmentation map; detecting a presence of the vascular marker in the extracted ROI using the first machine learning model, the vascular marker indicating arteriovenous nicking (AVN), focal narrowing (FN), central arteriolar light reflex (CAR), central light reflex (CRR), and/or arteriolar wall opacification In an aspect of the present disclosure, the method may further include: identifying an optic disc region in the preprocessed retinal image; and detecting a presence of the optic disc marker in the optic disc region using the first machine learning network, the optic disc-marker indicating papilledema.

In another aspect of the present disclosure, the method may further include: generating a preliminary score for each detection using a neural network; and integrating the preliminary scores to generate the severity score.

In accordance with aspects of the present disclosure, a non-transitory computer readable storage medium includes instructions that, when executed by a computer, cause the computer to perform a method for hypertensive retinopathy (HTNR) detection, the method including: preprocessing a retinal image using at least one of contrast enhancement, noise reduction, or resolution normalization; segmenting a plurality of vessels from the preprocessed retinal image to generate a vessel segmentation map; detecting a retinal marker, a vascular marker, and/or an optic disc marker in the preprocessed retinal image using a first machine learning model; generating a severity score based on the detections; determining that the severity score exceeds a predefined threshold; and generating an output indicating a presence of HTNR based on the vessel segmentation map and the severity score using a second machine learning model.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
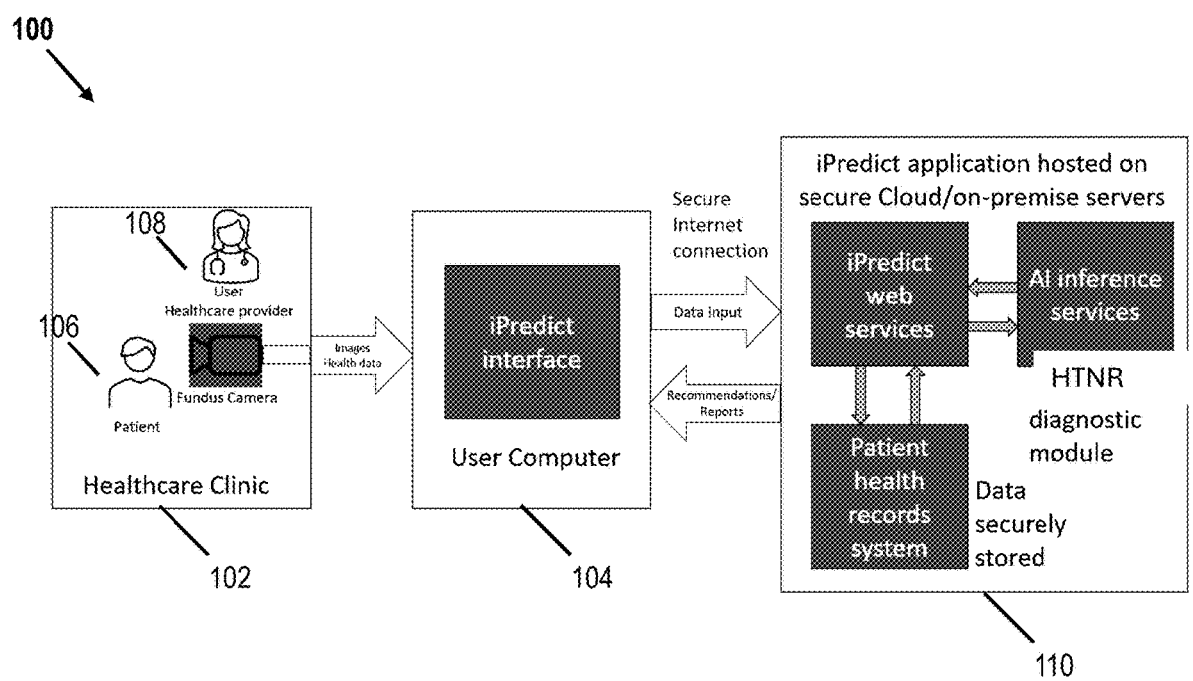
FIG. 1 is an illustration of an exemplary hypertensive retinopathy (HTNR) detection system, in accordance with aspects of the present disclosure.

The present application relates to systems and methods for automated hypertensive retinopathy (HTNR) detection using color fundus imaging and deep learning techniques.

For the purpose of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Various alterations, rearrangements, substitutions, and modifications of the features illustrated herein, and any additional applications of the principles of the present disclosure as illustrated herein, which would occur to one skilled in the relevant art and having possession of this disclosure, are to be considered within the scope of the present disclosure.

Performing automated HTNR detection is a non-invasive, cost-effective technique for early HTNR detection. Various classification systems may be employed during HTNR screening and/or detection. Some classification systems used include the Scheie classification system, the Keith-Wagener-Baker classification system, and/or the Wong-Mitchell classification system. Various other classification systems are contemplated and within the scope of this disclosure.

The Scheie classification system is a method used to grade the severity of HTNR by classifying the disease into four stages, based on the progression of retinal changes observed through ophthalmic examination. Stage I involves narrowing of the retinal arteries, indicating mild retinopathy. Stage II is characterized by more pronounced narrowing along with arteriovenous nicking, where the arteries and veins crossing each other begin to constrict. Stage III includes the findings of stages I and II along with retinal hemorrhages and/or exudates, showing moderate to severe disease. Finally, Stage IV, the most severe stage, adds papilledema to the symptoms of Stage III, indicating swelling of the optic disc due to increased intracranial pressure. This classification helps in assessing the progression of the disease and guiding treatment decisions.

The Keith-Wagener-Baker classification system is a method used to categorize the severity of HTNR into four grades, based on the appearance of the retina as seen through an ophthalmoscope. Grade 1 involves minimal arterial narrowing, suggesting mild disease. Grade 2 includes more pronounced arterial narrowing and arteriovenous nicking. Grade 3 is characterized by retinal hemorrhages and exudates, indicating moderate to severe disease. Finally, Grade 4 is the most severe form, including papilledema, a swelling of the optic disc, indicating very high intracranial pressure and severe hypertension.

The Wong-Mitchell classification system grades the severity of HTNR with three categories. Under "Mild," the classification criteria include one or more of the following signs: generalized arteriolar narrowing, focal arteriolar narrowing, arteriovenous nicking, arteriolar wall opacity. The "Moderate" category is characterized by one or more of these signs: retinal hemorrhage, which may be blot-, dot-, or flame-shaped, microaneurysm, cotton wool spots, hard exudates. For the "Severe" category, moderate retinopathy plus optic disc swelling.

The HTNR detection system disclosed includes an AI-driven system designed to automate the detection and/or classification of HTNR by analyzing retinal images with high accuracy and consistency. The HTNR detection system leverages machine learning models, such as convolutional neural networks (CNNs), to analyze fundus photographs (e.g., images of the retina) with high accuracy. Therefore, the AI-driven HTNR detection system is a comprehensive solution designed to automatically identify and classify hypertensive retinopathy severity from retinal fundus images. By training on a large dataset of annotated retinal images, the machine learning models can recognize the detailed patterns and/or changes associated with hypertensive retinopathy, including narrowed vessels, arteriovenous nicking, and focal narrowing. This allows the system to identify early signs of the disease with precision, helping to reduce the dependence on manual interpretation.

The HTNR detection system is structured in multiple stages, each targeting specific markers of hypertensive retinopathy, such as blood vessel segmentation, optic disc analysis, and detection of retinal features including hemorrhages and microaneurysms. Each stage feeds into an overall classification of the disease. This multi-module approach ensures that the system can provide a comprehensive analysis of the retina, enabling early diagnosis and monitoring. By automating the detection process, the AI-powered system offers a valuable support tool for healthcare professionals, making hypertensive retinopathy screening more accessible, particularly in areas with limited access to specialized care.

Using a multi-module approach, the HTNR detection system processes raw images through sequential stages that include image preprocessing, vessel segmentation, and specialized analysis of key retinal markers such as arteriovenous nicking, focal narrowing, and various biomarkers like hemorrhages and exudates. By leveraging advanced deep learning models such as U-Net, EfficientNet, and Xception, each module targets specific disease indicators with high precision. The HTNR detection system combines these outputs to provide a complete diagnostic assessment, using established classification scales to grade the severity of hypertensive retinopathy. This modular architecture ensures reliable, consistent diagnoses, supporting healthcare professionals in early disease detection and expanding access to retinal screening in diverse clinical settings.

For example, the HTNR detection system employs a multi-module architecture that includes preprocessing, vessel segmentation, and/or specific feature detection modules targeting key markers such as arteriovenous nicking or nipping (AVN), focal arteriolar narrowing (FAN), central arteriolar light reflex (CAR) and/or arteriolar wall opacity, Hollen Haust Plaques, hemorrhages, microaneurysms, cotton wool spots, exudates, and/or papilledema. Each module leverages deep learning models to isolate and classify these markers by severity. Outputs from the modules are integrated into a decision-making framework that applies established hypertensive retinopathy classification scales, such as the Wong-Mitchell, Keith-Wagener-Baker, and Scheie scales. The system thus provides a comprehensive diagnostic report, helping healthcare professionals make informed decisions while expanding access to accurate hypertensive retinopathy screening, particularly in resource-limited areas. Initial results indicate high sensitivity, specificity, and reliability, demonstrating this system's potential as an accessible, scalable tool for early detection and monitoring of hypertensive retinopathy.

This disclosure introduces an AI-based model designed to automate the detection and grading of HTNR using fundus images. By leveraging advanced machine learning techniques, including convolutional neural networks (CNNs), the model aims to analyze fundus photographs with high accuracy and consistency, surpassing traditional diagnostic methods. The model is trained on a large dataset of annotated fundus images of ten different retinal disorders, encompassing a wide range of hypertensive retinopathy cases. This training enables the model to learn intricate patterns and anomalies associated with the condition, facilitating precise identification and grading of hypertensive retinopathy.

Referring to FIG. 1, there is shown an illustration of an exemplary HTNR detection system 100 in accordance with aspects of the present disclosure. The HTNR detection system 100 includes a clinic 102 (e.g., a healthcare clinic), a computer system 104 (e.g., a user computer or a mobile device), and/or a prediction system 110 (e.g., an application hosted on a web server). HTNR detection system 100 includes an AI-based framework used to automate HTNR detection, highlighting key modules that enable the identification of retinal changes due to high blood pressure. For example, HTNR detection system 100 leverages machine learning techniques to analyze fundus images, facilitating scalability and efficient screening for HTNR.

A user 108 (e.g., a healthcare provider within the clinic 102) captures images (e.g., fundus images) and/or health data (e.g., sociodemographic and/or clinical data) related to a patient 106. For example, a fundus image of each eye of the patient is taken from a retinal fundus image with or without dilation. In aspects, the image can be up to 4000× 4000 in resolution in a widely used image format (e.g., JPEG, PNG, and/or TIF). After the fundus images are collected, modules may be used to produce grading for the HTNR diagnosis and/or screening.

The images may be captured using a camera, such as a fundus camera (e.g., a mydriatic fundus camera and/or a non-mydriatic fundus camera). In aspects, the camera may be a wide-field fundus camera, smartphone-based fundus camera, adaptive an optical coherence tomography (OCT) camera, scanning laser ophthalmoscope (SLO), multimodal imaging system, and/or other camera configured to capture retinal imaging. The images and/or health data are sent to computer system 104, where they may be displayed via an interface. For example, the images and/or health data may be displayed in an application on a desktop computer or a mobile device through a web interface.

Prediction system 110 includes web services, AI interface services (e.g., a CAC diagnostic module), and/or a records system (e.g., a patient health records system). In aspects, prediction system 110 may be an application hosted on a secure server and/or on-premise server. Computer system 104 and prediction system 110 (e.g., an iPredict system) are configured to exchange data in order to perform HTNR detection (e.g., automated HTNR detection). For example, computer system 104 is configured to send data input, such as images and/or health data, to prediction system 110. In turn, prediction system 110 is configured to send recommendations and/or reports to computer system 104, such as predictions related to automated HTNR detection.

The illustrated HTNR detection system 100 is merely exemplary. In aspects, other systems, servers, and/or devices not illustrated in FIG. 1 may be included. In aspects, one or more of the illustrated components may be omitted. Such and other embodiments are contemplated to be within the scope of the present disclosure.

Figure 2:
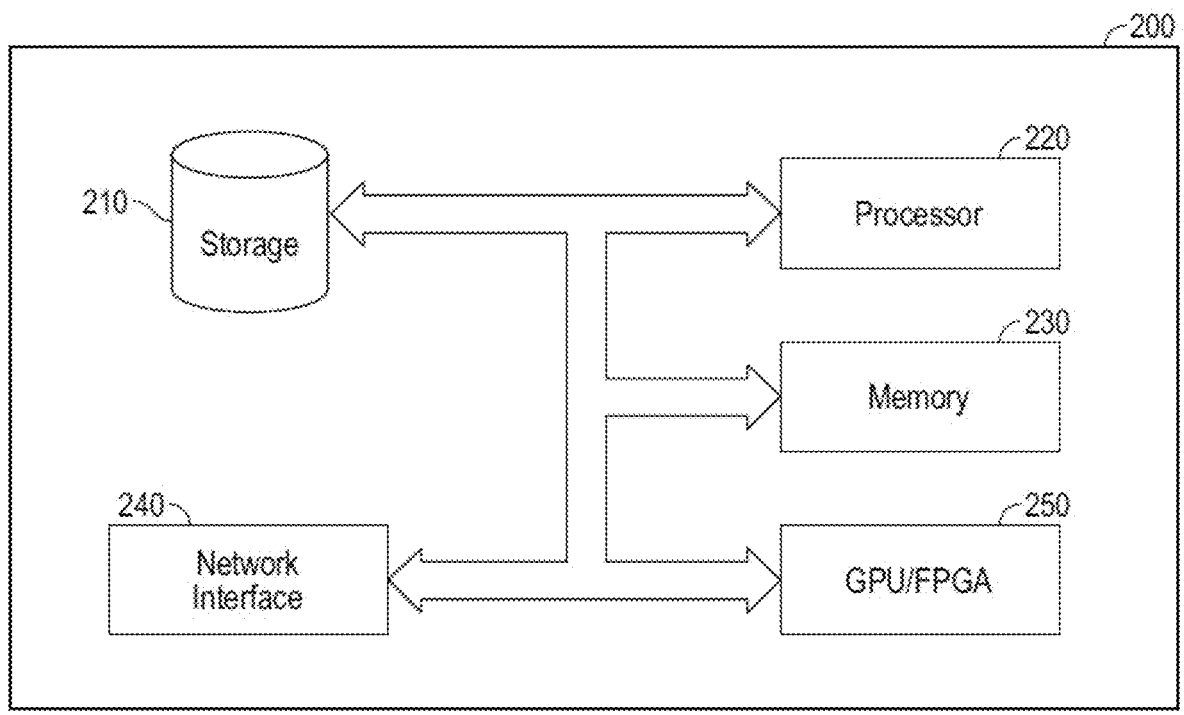
FIG. 2 is a block diagram of example components of a controller within the CAC estimation system of FIG. 1, in accordance with aspects of the present disclosure.

Referring now to FIG. 2, exemplary components of a controller 200 are shown. The controller 200 generally includes a storage or database 210, one or more processors 220, at least one memory 230, and a network interface 240. In aspects, the controller 200 may include a graphical processing unit (GPU) 250, which may be used for processing machine learning network models.

The database 210 can be located in storage. The term "storage" may refer to any device or material from which information may be capable of being accessed, reproduced, and/or held in an electromagnetic or optical form for access by a computer processor. Storage may be, for example, volatile memory such as RAM, non-volatile memory, which permanently holds digital data until purposely erased, such as flash memory, magnetic devices such as hard disk drives, and optical media such as a CD, DVD, Blu-ray Disc™, or the like. In aspects, data may be stored on the controller 200, including, for example, user data, camera data, video streams, and/or other data. The data can be stored in the database 210 and sent via the system bus to the processor 220. The database 210 may store information in a manner that satisfies information security standards and/or government regulations, such as Systems and Organization Controls (e.g., SOC 2), General Data Protection Regulation (GDPR), and/or International Organization for Standardization (ISO) standards.

As will be described in more detail later herein, the processor 220 executes various processes based on instructions that can be stored in the at least one memory 230 and utilizing the data from the database 210. The illustration of FIG. 2 is exemplary, and persons skilled in the art will understand that other components may exist in controller 200. Such other components are not illustrated for clarity of illustration.

Figure 3:
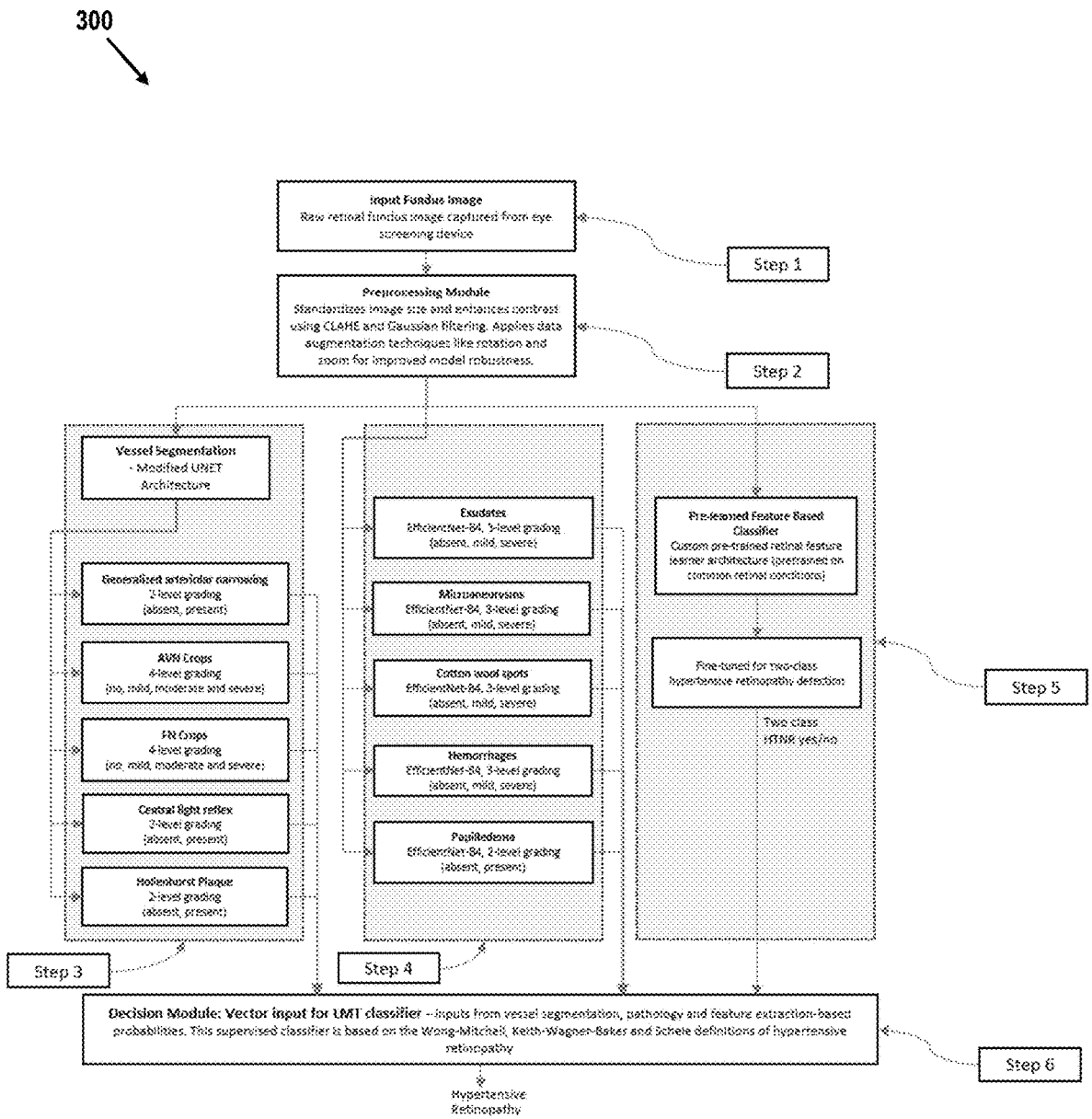
FIG. 3 is an exemplary implementation of the HTNR detection system of FIG. 1, in accordance with aspects of the present disclosure.

FIG. 3 is an exemplary implementation 300 of the HTNR detection system 100 of FIG. 1, in accordance with aspects of the present disclosure, which breaks down each critical component involved in detecting HTNR from image preprocessing to segmentation and classification modules, illustrating the multi-stage approach that enhances diagnostic precision and consistency in identifying retinal markers. In aspects, any of steps 1-6 may operate in varying orders and/or in parallel. HTNR detection system 100 includes various modules configured to process recommendations and/or reports. Generally, HTNR detection system 100 includes a preprocessing module 400, a vessel segmentation module 500, an arteriovenous nicking (AVN) detection module 700, a focal narrowing (FN) detection module 900, a combined AVN/FN detection module 1100, a central arteriolar light reflex (CAR) detection module 1200, a biomarker detection module 1300, and/or a papilledema detection module 2000 a classification and decision module 2100. In aspects, the modules may operate within the computer 104 and/or the prediction system 100.

At step 1, fundus images are input into the HTNR detection system 100. For example, raw retinal fundus images captured from eye screening devices at clinic 102 (e.g., using a mydriatic fundus camera and/or a non-mydriatic fundus camera) are input into the HTNR detection system 100 for preprocessing.

At step 2, images are preprocessed using a preprocessing module. For example, preprocessing module 400 may be configured to standardize image size and/or enhance a contrast using contrast limited adaptive histogram equalization (CLAHE) and/or Gaussian filtering techniques. In addition, the preprocessing module 400 may apply data augmentation techniques, such as rotation and zoom, for improved model robustness.

At step 3, vessel segmentation is performed, e.g., using vessel segmentation module 500, which may employ a modified UNET architecture. After segmentation, various modules may operate to extract further data. For example, the HTNR detection system 100 may extract data regarding generalized arteriolar narrowing (e.g., 2-level grading of absent, present), AVN crops (e.g., 4-level grading of none, mild, moderate, or severe), FN crops (e.g., 4-level grading of none, mild, moderate, or severe), central light reflex (e.g., 2-level grading of absent, present), and/or Hollenhorst plaque (e.g., 2-level grading of absent, present).

At step 4, various modules may operate to extract additional data. For example, the HTNR detection module 100 may extract data regarding exudates (e.g., 3-level grading a absent, mild, or severe), microaneurysms (e.g., 3-level grading a absent, mild, or severe), cotton wool spots (3-level grading a absent, mild, or severe), hemorrhages (3-level grading a absent, mild, or severe), and/or papilledema (e.g., 2-level grading of absent, present).

At step 5, a pre-learned feature-based classifier, such as classification and decision module 2100, may be employed for classifying images and/or extracted data. For example, classification and decision module 2100 is configured to utilize a custom, pre-trained retinal feature learner architecture. The classifier may be pretrained on common retinal conditions. Using the classifier, the data is fine-tuned for two-class HTNR detection (e.g., yes/no).

At step 6, a decision module, such as classification and decision module 2100, may receive a vector input for a logistic model tree (LMT) classifier. For example, the decision module is configured to receive inputs with vessel segmentation, pathology, and/or feature extraction-based probabilities. A supervised classifier (e.g., the LMT classifier of classification and decision module 2100) may be based on the Wong-Mitchell, Keith-Wagner-Baker, and/or Scheie definitions of HTNR. At the end of step 6, the HTNR detection system 100 may output a detection of HTNR.

Figure 4:
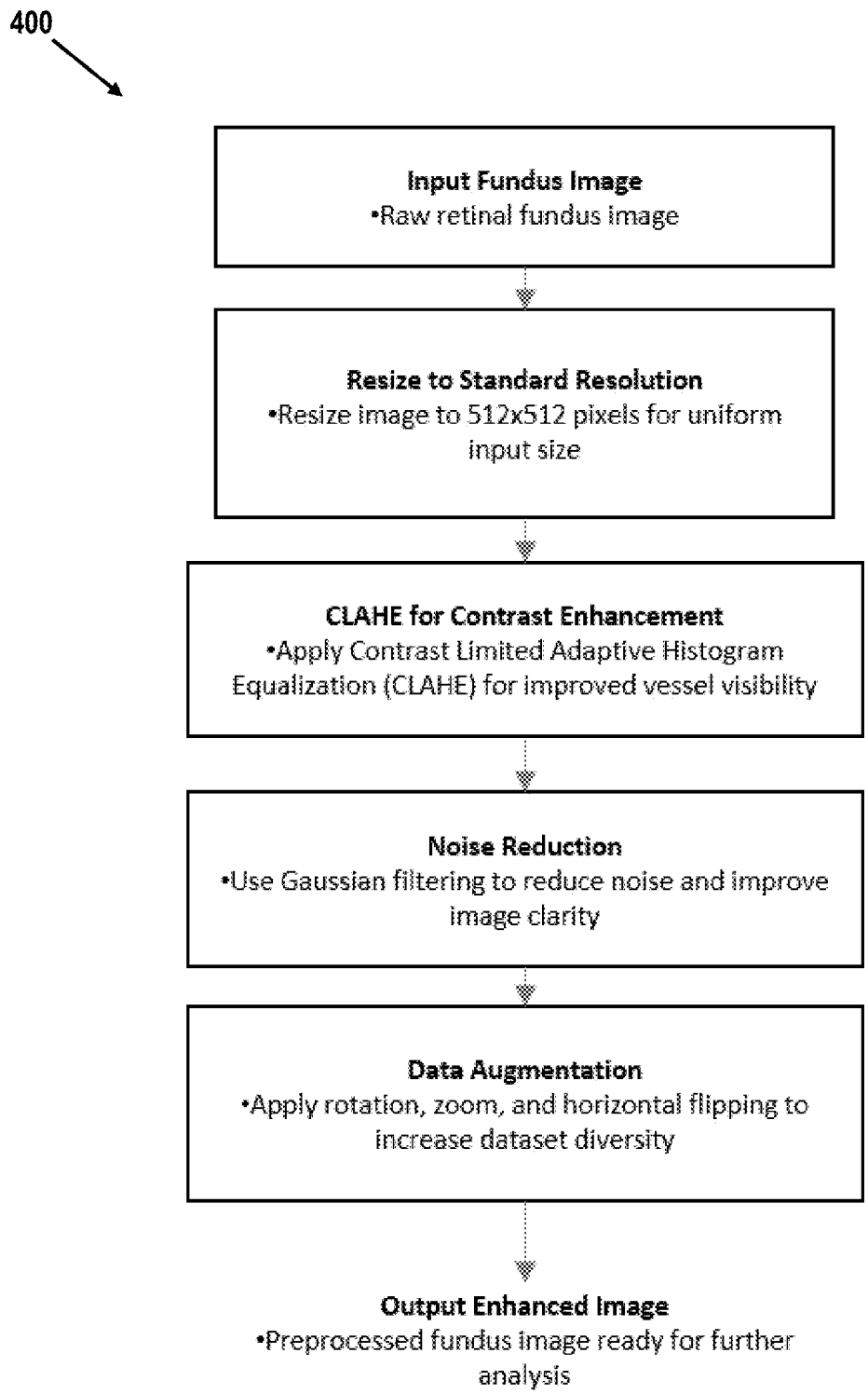
FIG. 4 is a block diagram of a preprocessing module of the HTNR detection system of FIG. 1, in accordance with aspects of the present disclosure.

FIG. 4 is a block diagram of a preprocessing module 400 of the HTNR detection system 100 of FIG. 1, in accordance with aspects of the present disclosure. The preprocessing module 400 accepts input fundus images and performs image normalization (e.g., resizing to a standard resolution), contrast enhancement, noise reduction, and/or data augmentation techniques to prepare fundus images for analysis by enhancing image quality and standardizing inputs.

The preprocessing module 400 accepts raw fundus images as input and applies a series of image enhancement techniques, such as resizing the images to a standard resolution (e.g., 512×512 pixels) and using contrast limited adaptive histogram equalization (CLAHE) to improve image contrast. In aspects, other resolutions compatible with architectures such as 50×50, 100×100, 380×380, or may be used. CLAHE is used to highlight subtle changes in blood vessels, which are crucial for detecting signs of HTNR. In addition to CLAHE, Gaussian filtering may be used for noise reduction, which minimizes interference from image artifacts. Data augmentation techniques including rotation, zoom, and/or flipping can also be applied to the input to increase diversity, thus improving model robustness during training. For example, preprocessing module 400 may apply a variety of augmentation techniques including random horizontal and vertical flips, rotations, and/or contrast adjustments to reduce overfitting and further increase generalizability. In aspects, advanced denoising algorithms, e.g., non-local means denoising and/or adaptive thresholding may be employed for specific cases where image noise or uneven lighting is prominent.

Figure 5:
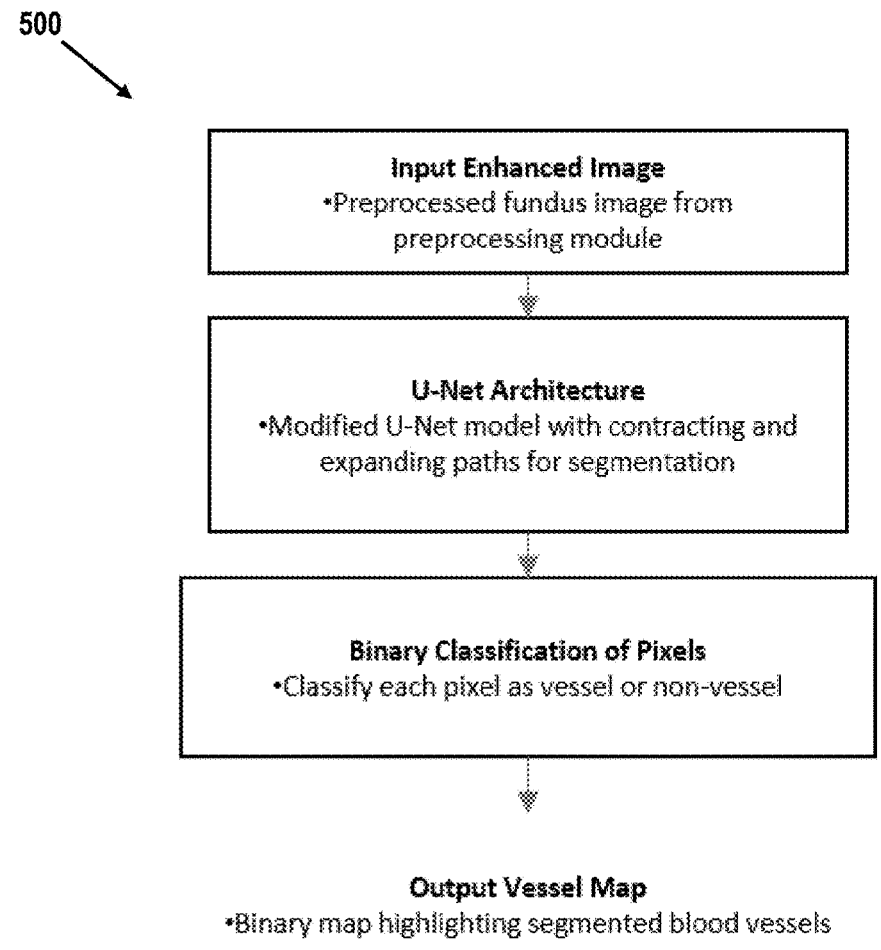
FIG. 5 is a block diagram of a vessel segmentation module of the HTNR detection system of FIG. 1, in accordance with aspects of the present disclosure.
Figure 6:
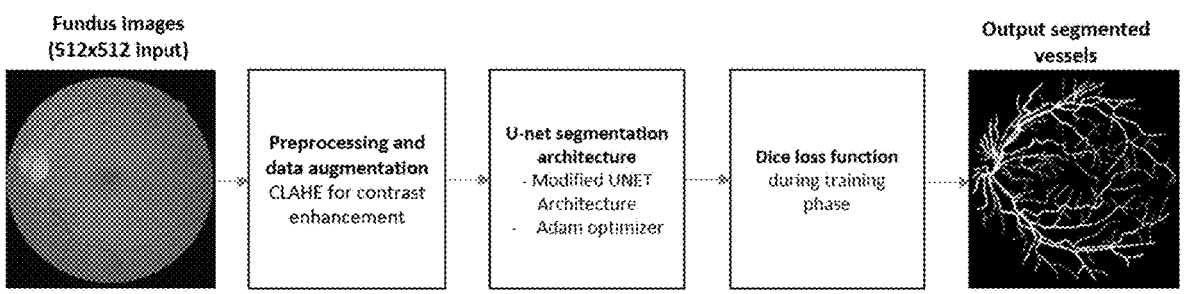
FIG. 6 is an exemplary implementation of the vessel segmentation module of FIG. 5, in accordance with aspects of the present disclosure.

FIGS. 5 and 6 illustrate a vessel segmentation module 500 of the HTNR detection system 100 of FIG. 1, in accordance with aspects of the present disclosure. The vessel segmentation module 500 enables retinal blood vessel segmentation and detection, isolating the retinal blood vessels from the retinal background for detailed vascular analysis. Generally, the vessel segmentation module 500 accepts enhanced fundus images (e.g., enhanced images from preprocessing module 400) as input, which are processed using a modified U-Net architecture and binary classification of pixels to output a vessel segmentation map.

The vessel segmentation module 500 employs a modified U-Net architecture (e.g., a convolutional neural network (CNN)) designed to accept retinal fundus images as input, specifically targeting the segmentation of retinal blood vessels. Thus, the vessel segmentation module 500 is optimized for medical imaging to isolate the retinal blood vessels, which enables precise localization of vessels critical for identifying hypertensive markers such as AV nicking and focal narrowing. The modified U-Net architecture includes a contracting path to capture spatial context through downsampling and an expanding path to reconstruct the segmented vessel map with high localization accuracy. For example, the vessel segmentation module 500 may accept an enhanced fundus image as input which, after processing, is output as segmented vessels includes a binary map (e.g., a segmentation grayscale (FIG. 6)), where each pixel is classified as either "vessel" or "non-vessel."

The modified U-Net architecture is modified with contracting and expanding paths for segmentation. Specifically, the U-Net includes a contracting path to capture context and a symmetric expanding path that enables precise localization. The contracting path includes repeated application of two 3×3 convolutions (e.g., rectified linear unit (ReLU) activated), followed by a 2×2 max pooling operation with stride 2 for downsampling. Each downsampling step doubles the number of feature channels. The expansive path combines the feature and spatial information through a sequence of up convolutions and concatenations with high-resolution features from the contracting path, followed by two 3×3 convolutions (e.g., ReLU activated). A 1×1 convolution reduces the final feature map to the desired number of classes, for example, binary classification for vessel and non-vessel pixels. In aspects, batch normalization is applied after each convolution to stabilize learning and/or reduce the number of training epochs required.

The U-Net is trained on annotated fundus images in which vessels have been manually marked. In aspects, the annotation may be completed by medical professionals or performed with AI. The U-Net utilizes both binary cross-entropy and dice loss functions to account for class imbalances, enhancing segmentation accuracy. Generally, the U-Net employs an Adam optimizer with a learning rate of 1e-4 and a batch size of 16. The loss function is a combination of binary cross-entropy and Dice loss, to account for the imbalance between the vessel and non-vessel classes in the segmented images, as the vessel pixels are typically outnumbered by background pixels. The training dataset includes pre-segmented fundus images, where the ground truth for vessel segmentation is manually annotated by medical professionals. The model is trained for 50 epochs, with early stopping implemented to prevent overfitting, based on the validation loss. In aspects, alternatives to U-Net may include fully convolutional networks (FCNs) or ResNet-based architectures, which can be effective for larger datasets. In aspects, more complex cases, conditional random fields (CRFs) may be added as a post-processing step to refine vessel boundaries.

Figure 7:
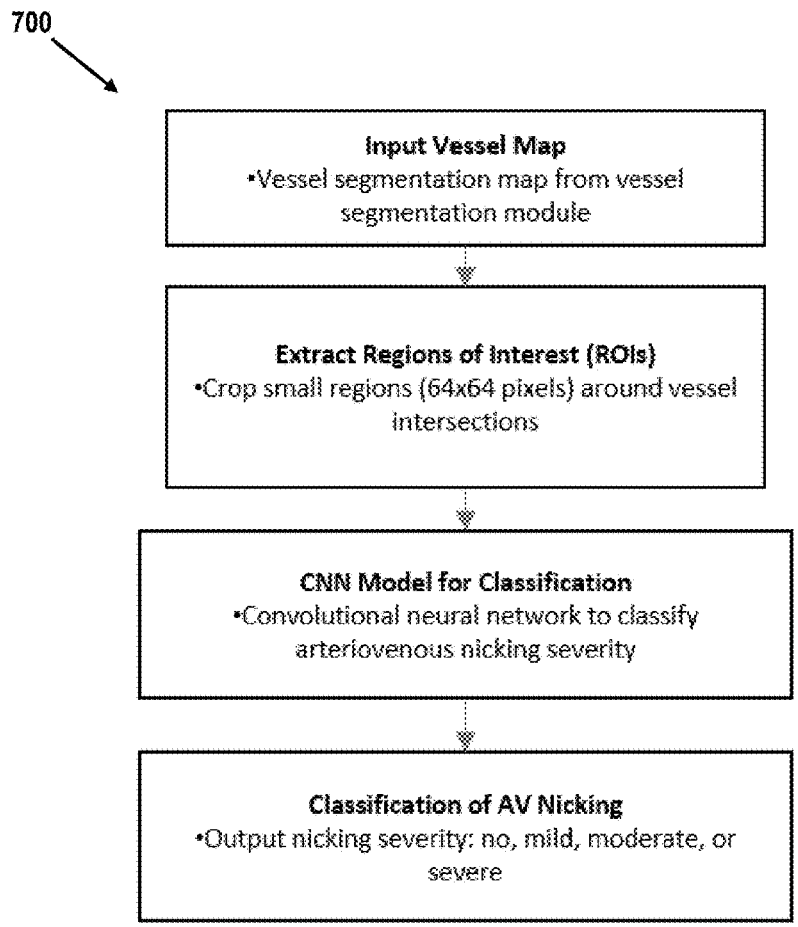
FIG. 7 is a block diagram of an arteriovenous nicking (AVN) detection module of the HTNR detection system of FIG. 1, in accordance with aspects of the present disclosure.
Figure 8:
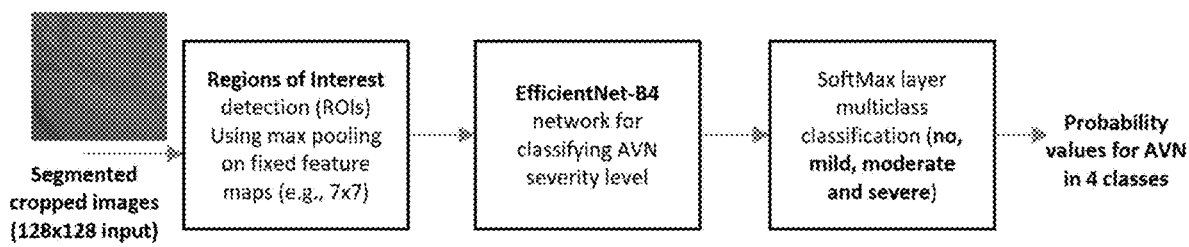
FIG. 8 is an exemplary implementation of the AVN detection module of FIG. 7, in accordance with aspects of the present disclosure.

FIGS. 7 and 8 illustrate an arteriovenous nicking (AVN) detection module 700 of the HTNR detection system 100 of FIG. 1, in accordance with aspects of the present disclosure. The AVN detection module 700 focuses on identifying the AVN in the vessel crossover region and grading the severity of arteriovenous (AV) nicking, a feature of hypertensive retinopathy. Generally, the AVN detection module 700 accepts vessel segmentation maps following vessel segmentation (e.g., by vessel segmentation module 500), then extracts regions of interest (ROIs), performs classification of AVN severity, and outputs the AVN probability for four classes.

Following vessel segmentation, the AVN detection module 500 extracts regions of interest (ROIs) around vessel intersections where AV nicking is likely to occur. The ROIs, typically sized at 64×64 pixels, are then analyzed using a CNN trained to classify the degree of AV nicking into four categories: no nicking, mild, moderate, and severe. The CNN includes multiple convolutional layers for feature extraction, pooling layers for downsampling, and dropout layers to prevent overfitting. The process for detecting arteriovenous nicking (AVN) involved three primary steps. Initially, the blood vessels in the fundus images are segmented to isolate the arterial and venous structures, in order to accurately identify areas where arteriovenous nicking may occur. Following segmentation, specific regions of interest (ROIs) around the vessels are cropped in grayscale, which facilitates a more focused analysis by the inference models. Finally, advanced inference models are run on the cropped regions to identify signs of AVN. For example, the AVN detection module 700 may start with vessel segmentation (e.g., segmented cropped images 128×128), cropping regions of interest (e.g. 7×7), and then running inference models to identify nicking severity to produce a probability for AVN in four classes, such that each block plays a role in detecting structural changes indicative of HTNR (FIG. 8). In aspects, the classification model of the AVN detection module 700 is trained to detect subtle changes in the vessel structure indicative of hypertensive retinopathy.

The classification model of the AVN detection module 700 is trained with a categorical cross-entropy loss function, and a 20% validation split is used to monitor performance. Data augmentation helps the model generalize across variations in retinal images, and the final layer uses SoftMax activation to output probabilities for each nicking category. For example, the classification model is trained using a categorical cross-entropy loss function, with the Adam optimizer (learning rate set to 1e-4) and a batch size of 32. The training data for AV nicking classification consists of the 64×64 crops, each manually labeled with the severity of AV nicking by medical experts. The classification model undergoes training for 100 epochs, with a validation split of 20% used to monitor performance and implement early stopping based on the validation accuracy. This two-stage approach combining precise vessel segmentation with subsequent classification of AV nicking severity leverages the capabilities of various machine learning frameworks to address the complex challenge of retinal image analysis for medical diagnostics.

The architecture employs MBConv blocks (inverted residuals and linear bottlenecks) as fundamental components, integrating squeeze-and-excitation blocks to model channel-wise relationships. The CNN, pre-trained on a large-scale image dataset, is fine-tuned on the cropped fundus images. The output layer is modified to classify images into four categories corresponding to no, mild, moderate, and severe Focal Narrowing, using a SoftMax activation function for probability distribution. The classification model is trained with a categorical cross-entropy loss function and the Adam optimizer, with a learning rate fine-tuned to 1e-5, over 50 epochs with batch size set to 16, employing data augmentation and dropout for regularization.

Upon successful training for vessel segmentation, the segmented images are then cropped into smaller crops of size 64×64 pixels, ensuring that each crop contains a portion of the retinal vessels. These crops serve as the input for the second phase of the algorithm, focused on classifying the severity of arteriovenous nicking (AV nicking) present in the retina. The classification model is a convolutional neural network that takes these crops as input and outputs a classification into four categories: no, mild, moderate, and severe AV nicking. The CNN architecture for classification comprises several convolutional layers with ReLU activation, max pooling for feature downsampling, and dropout layers to prevent overfitting. The final layer is a fully connected layer with a SoftMax activation function to output the probability distribution over the four classes.

In aspects, in addition to CNNs, a custom deep learning pipeline with transfer learning (e.g., using pre-trained ResNet or VGG models) could be applied if a large, annotated dataset for AV nicking is available. Transfer learning helps achieve accurate classification with smaller datasets by leveraging knowledge from general object recognition models.

Figure 9:
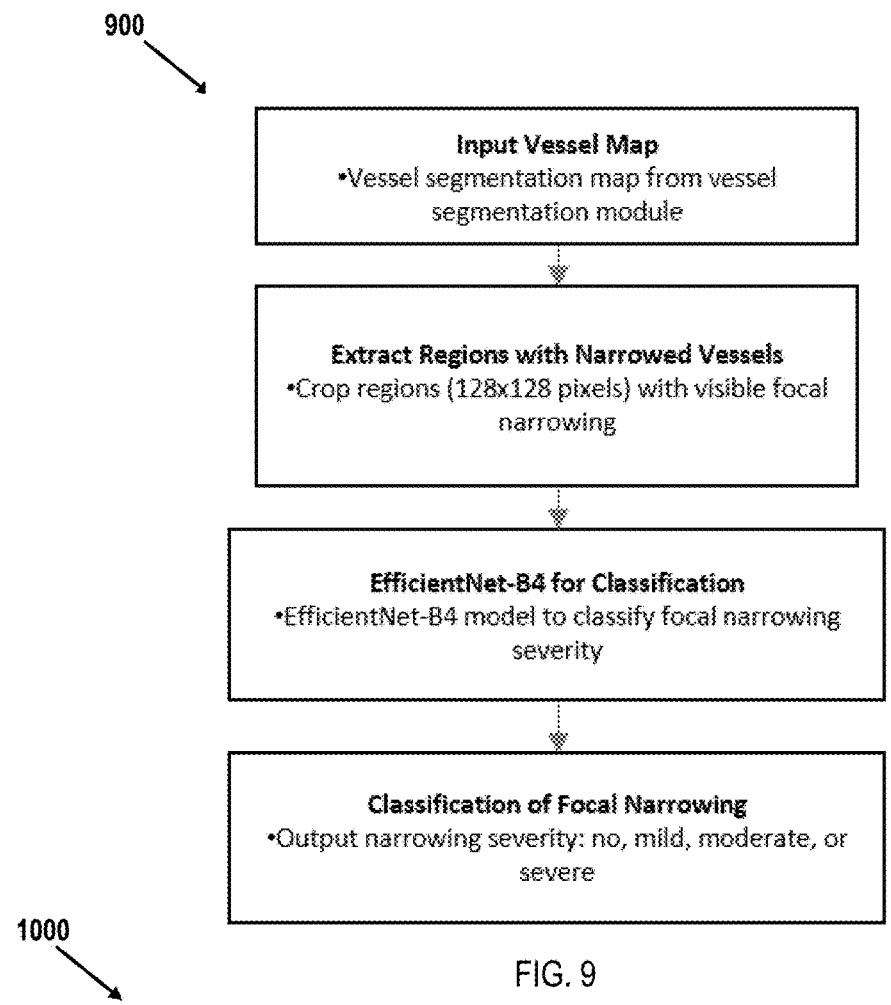
FIG. 9 is a block diagram of a focal narrowing detection module of the HTNR detection system of FIG. 1, in accordance with aspects of the present disclosure.
Figure 10:
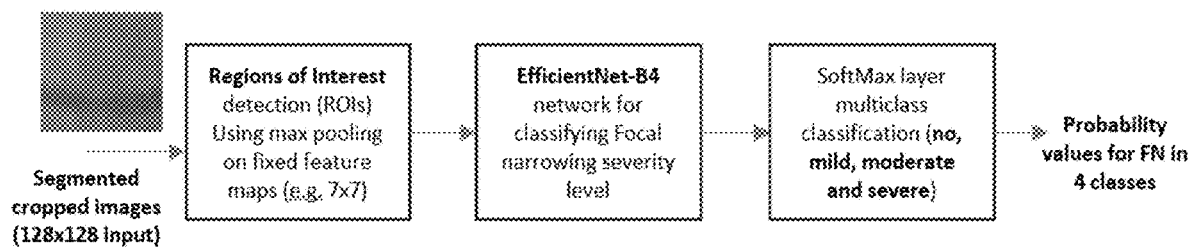
FIG. 10 is an exemplary implementation of the focal narrowing detection module of FIG. 9, in accordance with aspects of the present disclosure.

FIGS. 9 and 10 illustrate a focal narrowing (FN) detection module 900 of the HTNR detection system 100 of FIG. 1, in accordance with aspects of the present disclosure. FN is another symptom of HTNR to be detected. Like AV nicking, FN detection relies on vessel segmentation output and cropped ROIs (typically 128×128 pixels) focused on narrowed vessels. The FN detection module 900 uses a model that scales the network's depth, width, and resolution to balance computational efficiency and accuracy. The model is fine-tuned to classify FN severity into no, mild, moderate, and severe categories based on the vessel's diameter changes. Generally, the FN detection module 900 accepts as input vessel segmentation maps following vessel segmentation (e.g., by vessel segmentation module 500), then extracts regions of interest (ROIs), performs classification of FN severity, and outputs the FN probability for the four classes.

The methodology for detecting focal narrowing (FN) mirrors the approach used for AV Nicking detection. First, vessel segmentation is performed to identify arterial and venous structures within the fundus images. Next, areas around the vessels are cropped in grayscale to highlight potential sites of focal narrowing. Inference models specifically trained to recognize signs of FN analyze the cropped images. For example, narrowing is analyzed by models trained on precise patterns of vessel diameter changes. Models of the FN detection module 900 assess changes in vessel diameter that are characteristic of FN. For example, following vessel segmentation, the segmented images are cropped into smaller regions of interest (ROIs) of 128×128 pixels, focusing on areas containing vessels. These crops are then used to train a secondary model to classify the degree of Focal Narrowing within the retinal vessels. Each step from vessel segmentation to inference targets detection of localized vessel narrowing, a marker for hypertensive retinopathy. For example, the AVN detection module 900 may start with vessel segmentation (e.g., segmented cropped images 128×128), cropping regions of interest (e.g. 7×7), and then running inference models to identify FN severity to produce a probability for FN in the four classes, such that each block plays a role in detecting structural changes indicative of HTNR (FIG. 10).

This classification task leverages a model with an architecture distinguished by its compound scaling method that uniformly scales the network width, depth, and resolution through a set of fixed scaling coefficients, which allows for efficient model scaling that achieves higher accuracy with fewer parameters. The model uses categorical cross-entropy loss, and Adam optimization with a learning rate of 1e-5. Dropout and data augmentation are applied to enhance model robustness, and the SoftMax activation function in the final layer provides a probability distribution over the FN severity classes. In aspects, architectures that can handle larger feature maps may be used, which may improve FN detection accuracy for complex cases, especially in high-performance environments where computational resources are not a limiting factor.

Figure 11:
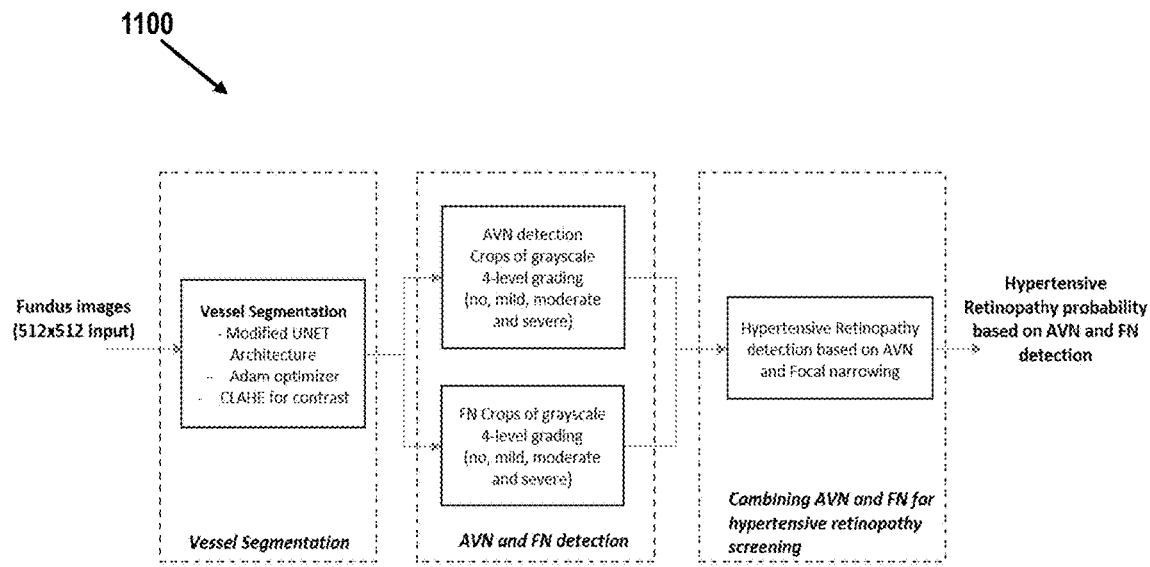
FIG. 11 is a block diagram of an exemplary implementation of a combined AVN/FN detection module of the HTNR detection system of FIG. 1, in accordance with aspects of the present disclosure.

FIG. 11 illustrates an exemplary implementation of a combined AVN/FN detection module 1100 of the HTNR detection system 100 of FIG. 1, in accordance with aspects of the present disclosure. For a comprehensive hypertensive retinopathy model, both AVN and FAN detections can be combined. The model of the combined AVN/FN detection module 1100 evaluates fundus images for the presence of either condition, using the previously described steps for AVN and FN detection and the severity of the condition. Decisions on HTNR presence are made based on calculated probabilities for AVN and FN, using predetermined thresholds to improve diagnostic accuracy.

AV Nicking detection steps includes segmentation of the vessels, crops of various regions in grayscale, and running inference models on the crops HTNR disease prevalence. Focal narrowing detection steps include segmentation of the vessels, crops of various regions in grayscale, and running inference models on the crops. Thus, combined AVN+FN detection includes detection of either AVN or FN (mild or worse), and uses thresholds based on probability of AVN or FN detection.

Figure 12:
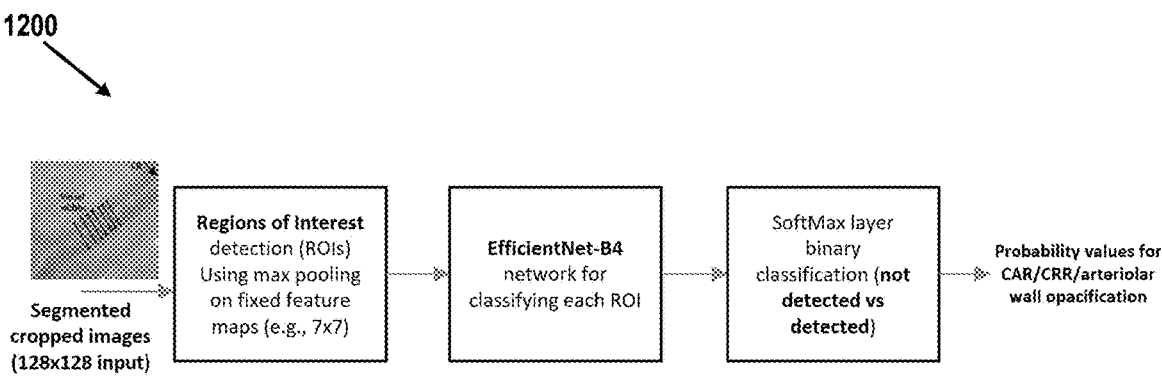
FIG. 12 is a block diagram of a central arteriolar light reflex (CAR) detection module of the HTNR detection system of FIG. 1, in accordance with aspects of the present disclosure.

FIG. 12 illustrates a central arteriolar light reflex (CAR) detection module 1200 of the HTNR detection system 100 of FIG. 1, in accordance with aspects of the present disclosure. The CAR detection module 1200 is configured to detect a probability of central arteriolar light reflex (CAR), central light reflex (CRR), and/or arteriolar wall opacification. The CAR detection module 1200 may use similar steps to the AVN/FN detection module. For example, the CAR detection module 1200 may accept as input segmented cropped images (e.g., 128×128) and ROIs may be extracted (e.g., 7×7), and then running inference models to classify each ROI to produce a probability for CAR/CRR/arteriolar wall opacification in two classes (e.g., not detected or detected).

Figure 13:
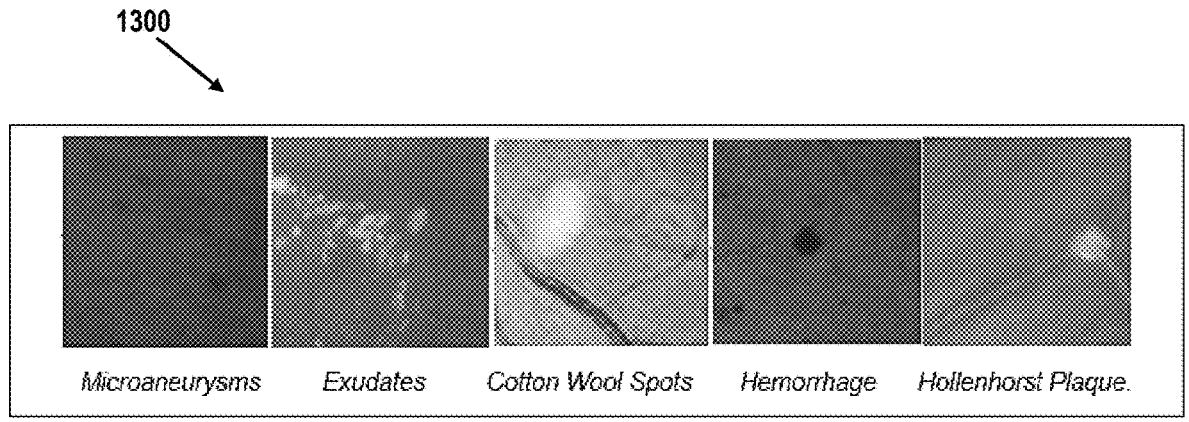
FIG. 13 illustrates exemplary biomarkers, in accordance with aspects of the present disclosure.

FIG. 13 illustrates exemplary biomarkers, in accordance with aspects of the present disclosure. Exemplary biomarkers of HTNR may include microaneurysms, exudates, cotton wool spots, hemorrhages, and/or Hollenhorst plaque. Each is discussed below.

Microaneurysms are typically tiny, round, red dots that appear in the retina due to the weakening and dilation of capillary walls, often representing the earliest visible signs of diabetic retinopathy and resulting from localized endothelial cell damage and pericyte loss, which leads to increased vascular permeability and potential leakage of fluid or blood into the surrounding retinal tissue.

Exudates are generally yellowish-white lipid and protein deposits that accumulate in the retina due to leakage from damaged blood vessels, commonly seen in diabetic retinopathy and hypertensive retinopathy, where chronic vascular compromise leads to increased permeability and fluid extravasation; they often appear in clusters or ring-like patterns around areas of leakage and can contribute to macular edema, potentially impairing vision if they accumulate near the fovea, though they may resolve if the underlying vascular disease is managed effectively.

Cotton wool spots are typically small, fluffy, white lesions in the retina that form due to localized retinal ischemia and microvascular occlusion, which lead to axoplasmic flow stasis and the subsequent accumulation of swollen nerve fiber layer axons, often serving as an indicator of underlying systemic vascular diseases such as diabetes, hypertension, or HIV-related retinopathy. Hemorrhages in the retina are often caused by ruptured blood vessels and can present in various forms, including dot-blot hemorrhages within the deeper retinal layers due to venous congestion, flame-shaped hemorrhages in the nerve fiber layer following arteriolar damage, and sub hyaloid or vitreous hemorrhages when blood leaks into the space between the retina and vitreous humor, commonly occurring in conditions like diabetic retinopathy, hypertensive retinopathy, and retinal vein occlusions.

A Hollenhorst plaque is typically a bright, refractile cholesterol embolus that becomes lodged within the retinal arterioles, typically originating from atherosclerotic plaques in the carotid arteries, and its presence suggests an increased risk of significant vascular events such as stroke, transient ischemic attack, or other embolic complications, often requiring systemic cardiovascular evaluation and management.

Figure 14:
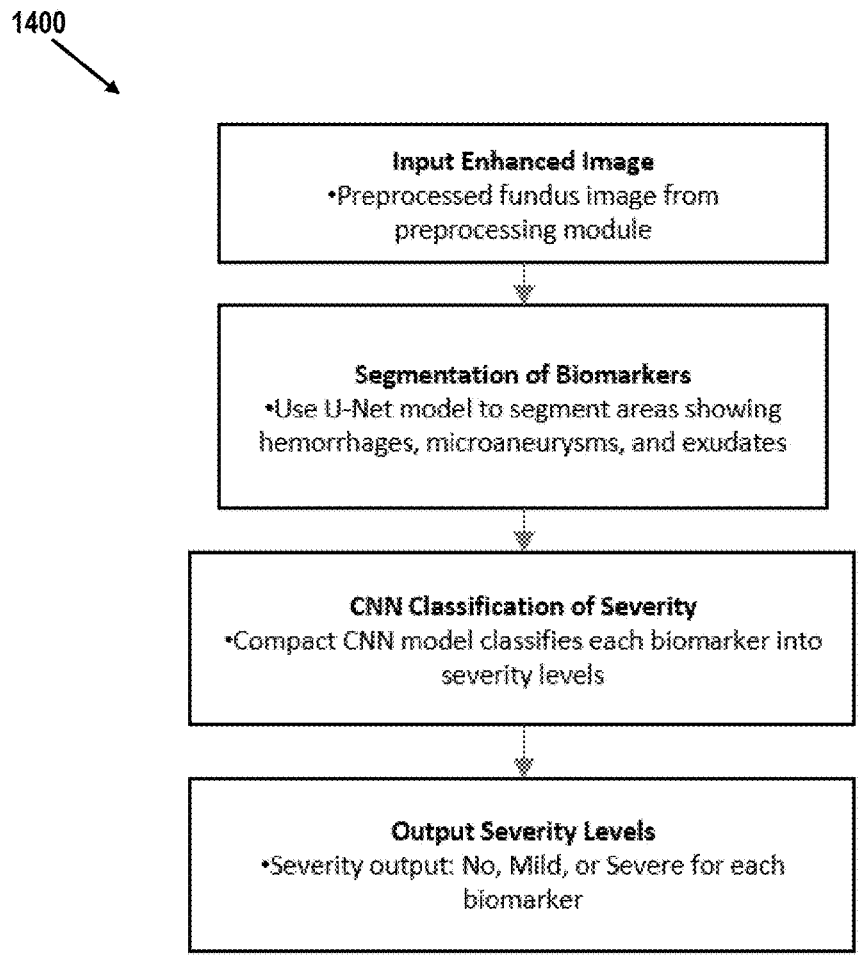
FIG. 14 is a block diagram of a biomarker detection module of the HTNR detection system of FIG. 1, in accordance with aspects of the present disclosure.

FIG. 14 is an illustration of a biomarker detection module 1400 of the HTNR detection system 100 of FIG. 1, in accordance with aspects of the present disclosure. The biomarker detection module 1400 is configured to detect biomarkers associated with hypertensive retinopathy progression, including microaneurysms, exudates, cotton wool spots, hemorrhages, and/or Hollenhorst plaque (e.g., retinal markers). Generally, the biomarker detection module receives preprocessed fundus images (e.g., from the preprocessing module 400), segments areas showing biomarkers, classifies the severity of each biomarker, and outputs a severity level prediction (e.g., no, mild, severe). Individual modules and/or models may be used in the biomarker detection module 1400 to predict a severity level of each type of biomarker.

Each biomarker is generally detected through a two-step process of segmentation and classification. For example, the hemorrhage detection (FIG. 16) uses a U-Net for segmentation, highlighting regions of potential hemorrhage. A compact CNN classifier then grades severity based on hemorrhage area and density. Similarly, microaneurysms (FIG. 15) and exudates (FIG. 17) are segmented and graded using a CNN, which categorizes severity into "No," "Mild," and "Severe" based on size and distribution. In aspects, for complex segmentation, Mask R-CNN can be used to achieve more refined results, particularly if high-resolution fundus images are used. For classification, adding ensemble techniques (e.g., combining the CNN with a custom CNN) may further improve accuracy.

Figure 15:
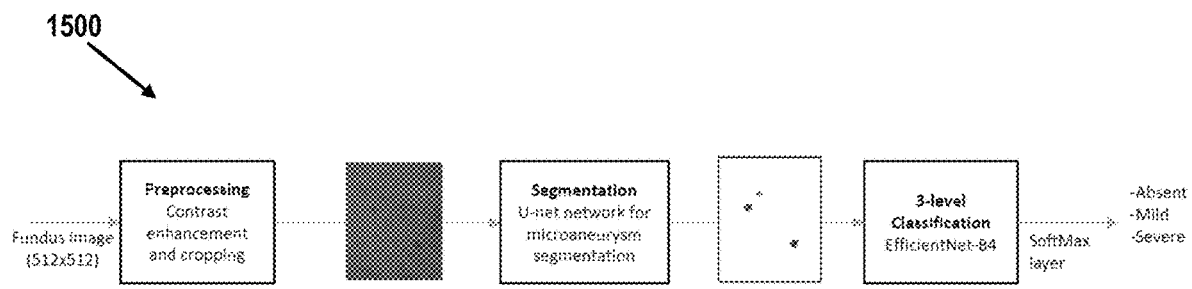
FIG. 15 is an exemplary implementation of the biomarker detection module of FIG. 14 for microaneurysms, in accordance with aspects of the present disclosure.

FIG. 15 is an exemplary implementation of the biomarker detection module 1400 of FIG. 14 for microaneurysms (MA), in accordance with aspects of the present disclosure. MA detection involves MA segmentation, which isolates small vascular bulges, helping assess early hypertensive changes in retinal health. The MA detection and severity grading works in a two-step approach, e.g., segmentation and classification for "No," "Mild (only one or two MAs)," and "Severe (many MAs)" categories using a deep learning pipeline. In the segmentation phase, a pre-trained convolutional neural network (CNN), (e.g., U-Net 70), is fine-tuned on annotated fundus images to delineate MA accurately. For example, with a retinal fundus image of size 512×512 as input, a fine-tuned U-Net architecture with enhanced depth, leveraging batch normalization and dropout for regularization, operates on preprocessed images, and adaptive histogram equalization and/or Gaussian filtering are applied for contrast enhancement and noise reduction. Hand-labeled MA images are used to train the network for segmentation. The network applies a series of convolutional, activation, and max-pooling layers to extract feature maps, which are then up-sampled to generate precise segmentation masks corresponding to the locations of MAs. The approach also employs data augmentation techniques, including rotation and scaling, to enrich the training dataset, ensuring robustness against variability in the MA.

Following segmentation, a classification model, e.g., another CNN in the biomarker detection module 1400, is trained on the segmented regions to categorize the severity of MA based on the number, size, and/or distribution of detected MA. The compact CNN classifier, which incorporates layers with ReLU activation and is optimized using Adam, categorizes the severity into "No," "Mild," and "Severe" based on characteristics such as area and density. The classification stage outputs a SoftMax probability distribution across the three categories, facilitating a grading of hemorrhage severity based on the thresholds. For example, when tested on 500 normal and 500 images (e.g., 250 from each severity group randomly selected from the AusDiab 102, SiMES 98, and Messidor II 103 datasets based on the presence of both severity levels of MA), the model achieved above 90% accuracy on mild MA presence and above 95% accuracy on severe/many MA presence.

This model, with the biomarker detection module 1400, outputs a probabilistic score for each category, which can then be thresholded to provide a definitive grading. The entire pipeline emphasizes the application of advanced image processing techniques, such as adaptive histogram equalization for contrast enhancement and morphological operations for noise reduction, to improve the robustness and accuracy of microaneurysm detection and grading.

Figure 16:
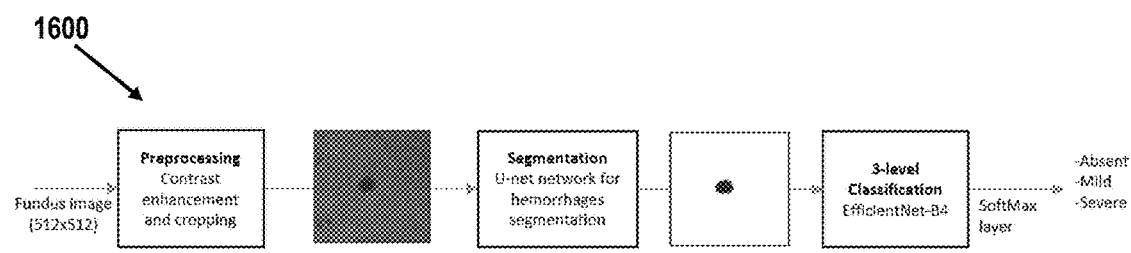
FIG. 16 is an exemplary implementation of the biomarker detection module of FIG. 14 for hemorrhages, in accordance with aspects of the present disclosure.

FIG. 16 is an exemplary implementation of the biomarker detection module 1400 of FIG. 14 for hemorrhages, in accordance with aspects of the present disclosure. Hemorrhage detection identifies areas indicative of small blood leaks, commonly linked with advanced hypertensive retinopathy. The algorithm for detecting and grading hemorrhages in fundus images includes a similar two-step approach of segmentation followed by classification. For segmentation, with a retinal fundus image (e.g., of size 512×512) as input, a fine-tuned U-Net architecture with enhanced depth (e.g., leveraging batch normalization and dropout for regularization) operates on preprocessed images where adaptive histogram equalization and Gaussian filtering are applied for contrast enhancement and noise reduction (e.g., isolating small, dense regions). The segmented hemorrhages are then input into a compact CNN classifier, which incorporates layers with ReLU activation and is optimized using Adam, to categorize the severity into "No," "Mild," and "Severe" based on characteristics such as area and density. This dual-phase approach employs data augmentation techniques (e.g., large-scale data augmentation including rotation and scaling), to enrich the training dataset, ensuring robustness against variability in hemorrhage presentations such that the model can generalize across a variety of presentations. The classification stage outputs a SoftMax probability distribution across the three categories, facilitating a grading of hemorrhage severity based on the thresholds.

Figure 17:
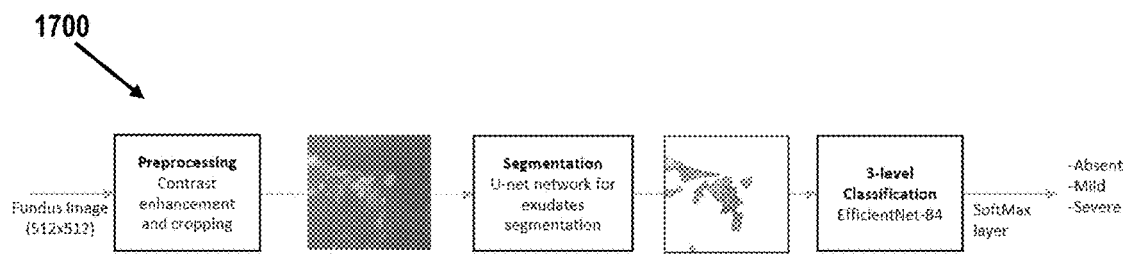
FIG. 17 is an exemplary implementation of the biomarker detection module of FIG. 14 for exudates, in accordance with aspects of the present disclosure.

FIG. 17 is an exemplary implementation of the biomarker detection module 1400 of FIG. 14 for exudates, in accordance with aspects of the present disclosure. Exudate identification includes detecting lipid residues that can accumulate due to hypertension that are key biomarkers in the screening process. Similar to hemorrhages and microaneurysms, exudate detection is a two-step process. The segmentation phase uses a U-Net architecture, optimized with batch normalization and dropout to prevent overfitting, and processes images enhanced through adaptive histogram equalization for contrast improvement and Gaussian filtering for noise minimization. After segmentation, a CNN, (e.g., a straightforward CNN) optimized with Adam and/or utilizing ReLU activation functions classifies the severity of exudates into "No," "Mild," and "Severe" based on size and spread. The training set is augmented with techniques such as rotation and scaling to ensure robustness. For classification, the algorithm employs a SoftMax layer to generate a probabilistic distribution across the severity categories, enabling precise grading of exudate presence. This method maintains a focus on accuracy and efficiency in diagnosing exudate severity in retinal images.

Figure 18:
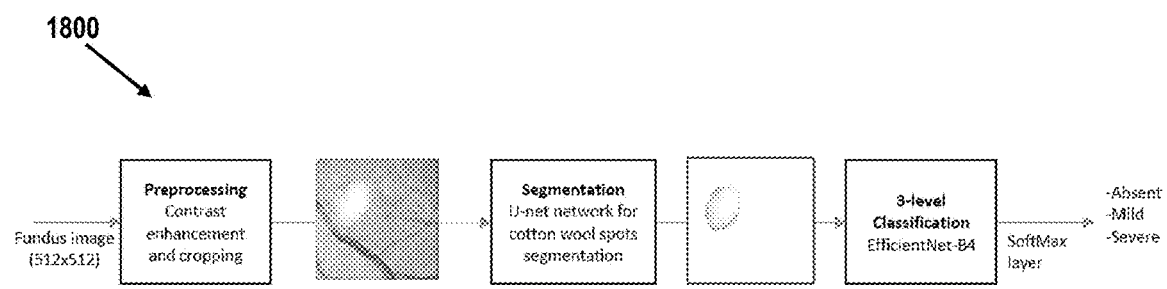
FIG. 18 is an exemplary implementation of the biomarker detection module of FIG. 14 for cotton wool spots, in accordance with aspects of the present disclosure.

FIG. 18 is an exemplary implementation of the biomarker detection module 1400 of FIG. 14 for cotton wool spots, in accordance with aspects of the present disclosure. Similar to the other algorithms, a two-step approach is used. In the segmentation stage, the U-Net architecture is adapted to emphasize the soft, fluffy appearance of cotton wool spots against the complex background of the retina, utilizing preprocessing techniques such as adaptive histogram equalization for enhanced contrast and/or Gaussian blurring to reduce image noise. This step ensures the distinct, fluffy characteristics of cotton wool spots are accurately captured. Following segmentation, a custom CNN classifier, incorporating ReLU activations and optimized with the Adam algorithm, categorizes the spots based on their potential impact on visual function into "Absent," "Present-Mild," or "Present-Severe." This classification is informed by the size, number, and/or distribution of the spots, with data augmentation methods like image rotation and scaling employed during training to enhance model robustness and generalization. The algorithm concludes with a SoftMax layer, providing a probabilistic estimate of severity, thereby merging precise pathological detection with the practicalities of computational analysis in ophthalmic imaging.

Figure 19:
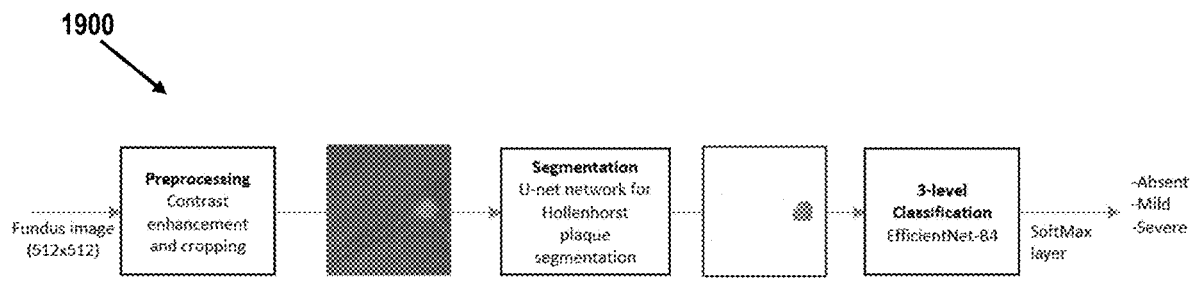
FIG. 19 is an exemplary implementation of the biomarker detection module of FIG. 14 for Hollenhorst plaque, in accordance with aspects of the present disclosure.

FIG. 19 is an exemplary implementation of the biomarker detection module 1400 of FIG. 14 for Hollenhorst plaque, in accordance with aspects of the present disclosure. The algorithm detects Hollenhorst plaques in fundus images through a two-step process of segmentation and classification. The segmentation utilizes a U-Net architecture (e.g., refined for medical imagery) enhanced by adaptive histogram equalization and Gaussian blurring for contrast and noise improvement, aimed at highlighting the characteristic bright, cholesterol-rich plaques. Subsequent classification is performed by a tailored CNN, while employing ReLU activations and optimized through Adam, to categorize plaques based on their implications for retinal health into "Absent," "Mild," or "Severe". This classification considers plaque number, location, and potential blood flow obstruction, leveraging data augmentation for robust generalization. The SoftMax function finalizes the process and produces an output.

Figure 20:
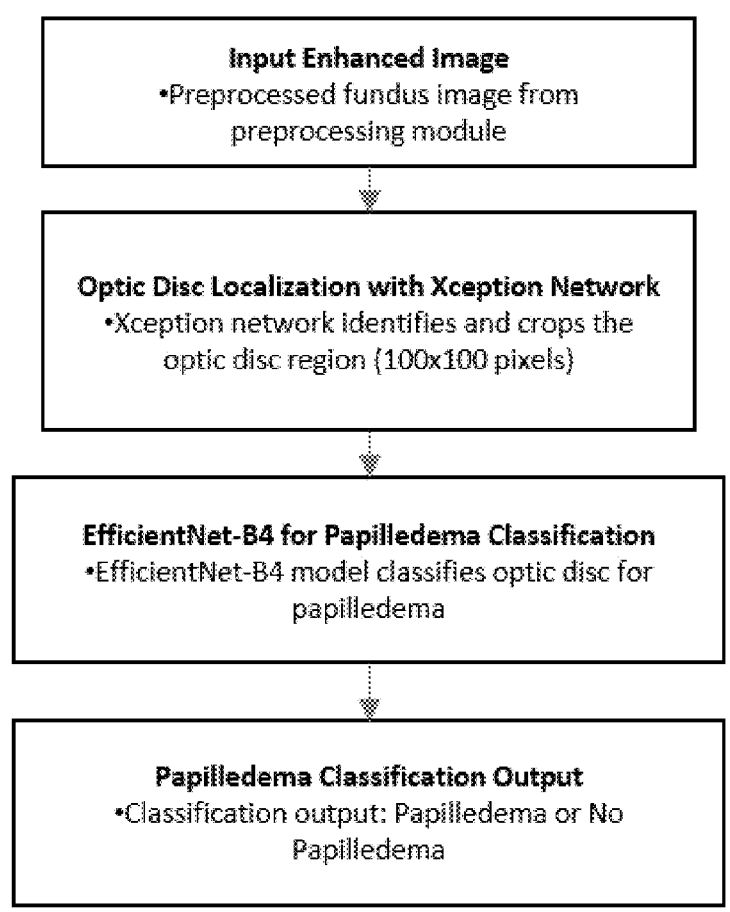
FIG. 20 is a block diagram of a papilledema detection module of the HTNR detection system of FIG. 1, in accordance with aspects of the present disclosure.

FIG. 20 is an illustration of a papilledema detection module 2000 of the HTNR detection system 100 of FIG. 1, in accordance with aspects of the present disclosure. Papilledema detection includes focusing on signs of optic disc swelling related to high blood pressure, which enables early intervention by identifying optic nerve-related complications. The papilledema module 2000 is configured to identify papilledema, a swelling of the optic disc, which can signal severe HTNR. Generally, the papilledema module 2000 accepts as input preprocessed fundus images from preprocessing module 4000, then performs optic disc localization, classification of optic discs, and outputs a classification output (e.g., papilledema present or not present).

The papilledema module 2000 uses a two-stage approach: optic disc localization and papilledema classification. Initially, the network (e.g., Xception network) identifies the optic disc area and crops the area (e.g., crops the area to a 100×100 pixel region) Then, the cropped image is passed to the CNN model for final classification. The papilledema module 2000 evaluates the optic disc for signs of swelling, categorizing each case as "Papilledema" or "No Papilledema." The model is trained on large, annotated datasets, which provide diverse retinal images. Such diversity enhances model performance across different demographics. In aspects, YOLO (You Only Look Once) is employed for faster optic disc localization. In aspects, DenseNet is employed for effectively capturing detailed visual patterns.

Figure 21:
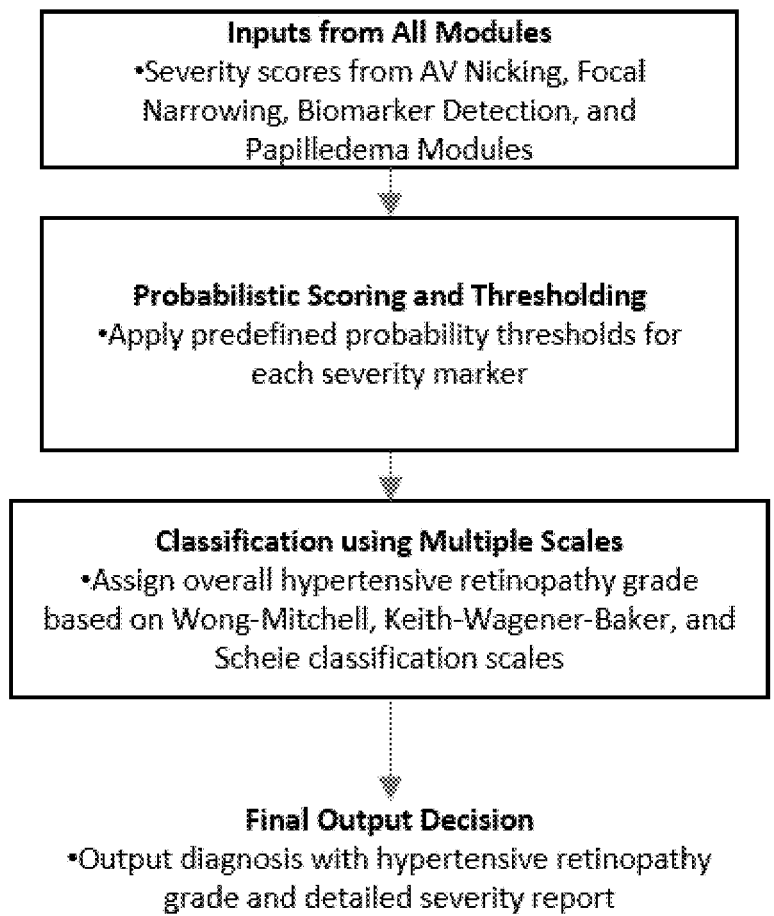
FIG. 21 is a block diagram of a classification and decision module of the HTNR detection system of FIG. 1, in accordance with aspects of the present disclosure.

FIG. 21 is an illustration of a classification and decision module 2100 of the HTNR detection system of FIG. 1, in accordance with aspects of the present disclosure. The classification and detection module 2100 is configured to integrate outputs (e.g. severity scores) from all modules into a comprehensive HTNR classification using established scales, providing an overall assessment of hypertensive retinopathy risk for facilitating clinical decision support. Generally, the classification and detection module 2100 performs probabilistic scoring and thresholding, and classification using multiple scales to output a final decision and/or diagnosis for HTNR.

The classification and detection module 2100 uses three classification scales: the Wong-Mitchell, Keith-Wagener-Baker, and Scheie classifications. Each scale has different criteria based on the severity of retinal vessel narrowing, hemorrhages, AV nicking, exudates, and/or optic disc changes. The classification and detection module 2100 applies probabilistic thresholds (e.g., predefined probability thresholds) to each detected feature (e.g., AVN, FN, biomarker and/or papilledema detection) and determines the overall disease grade based on which criteria thresholds are met. For example, an input with mild AVN and FN may be classified as "Grade 1" under the Keith-Wagener-Baker system, while an input with severe vessel narrowing and hemorrhages may fall into "Grade 3." Probabilistic scoring ensures that classifications reflect the combined severity of multiple markers rather than any single abnormality. In aspects, the classification and detection module 2100 is enhanced with fuzzy logic and/or Bayesian inference, allowing for adaptive scoring that accounts for interdependencies among biomarkers.

Figure 22:
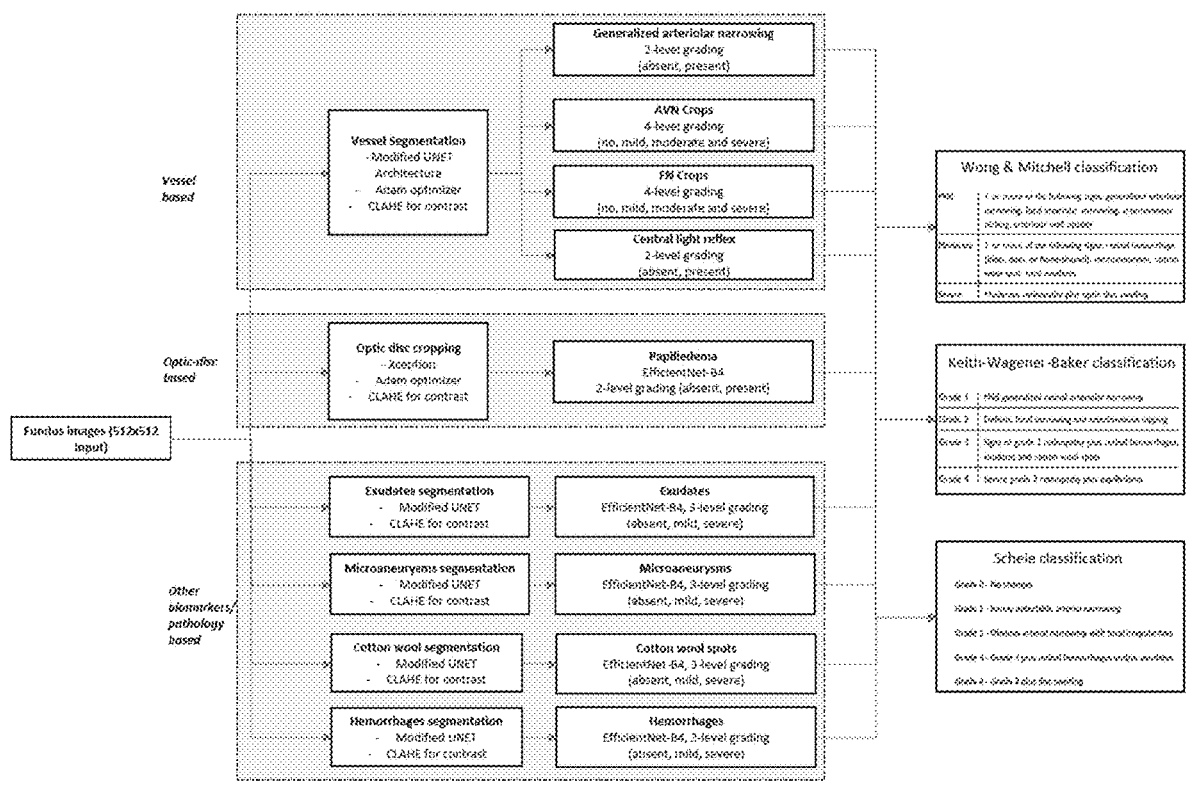
FIG. 22 is an exemplary implementation of HTNR detection, in accordance with aspects of the present disclosure.

FIG. 22 is an exemplary implementation of HTNR detection based on three existing protocols, in accordance with aspects of the present disclosure. As shown, a fundus image may be processed through various modules to extract data (e.g., vessel-based, optic0disc based, and biomarkers/pathology-based). This data is then classified based on the Wong-Mitchell, Keith-Wagener-Baker, and Scheie classifications. FIG. 22 provides an overall view of the modules cooperating to produce the HTRN prediction.

Figure 23:
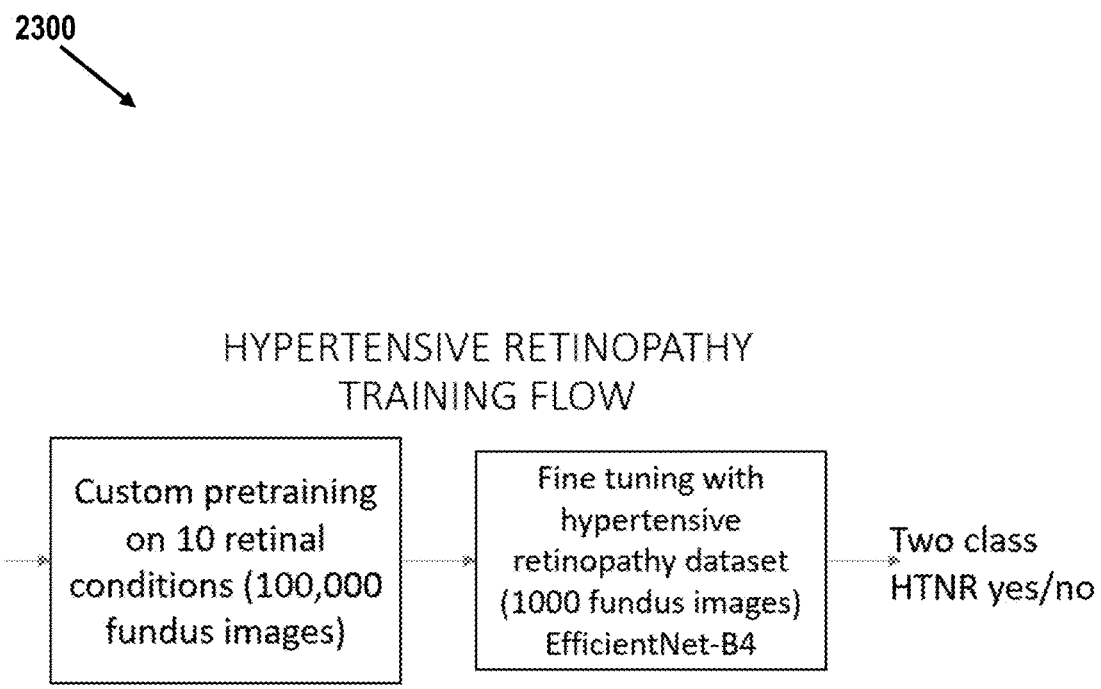
FIG. 23 is an illustration of an HTNR training flow, in accordance with aspects of the present disclosure.

FIG. 23 is an illustration of an HTNR training flow, in accordance with aspects of the present disclosure. Generally, the HTNR detection system 100 is pretrained on 10 retinal conditions (e.g. 100,000 fundus images), and fine-tuned with HTNR dataset(s) (e.g., 1,000 fundus images).

A CNN is employed for efficiency in handling large-scale image classification tasks. The base architecture of the network is pretrained on a custom dataset containing 100,000 fundus images, generally annotated for ten different retinal conditions: diabetic retinopathy, glaucoma, cataract, age related macular degeneration, myopia, epiretinal membrane macular hole, macular edema choroidal neovascularization, and/or retinal vein occlusion. In aspects, less and/or additional conditions may be included. During this pretraining phase, the model learns to extract general retinal features such as vascular patterns, lesions, and/or other pathologies, which are crucial in distinguishing different retinal diseases. Once the model is pretrained, transfer learning and fine-tuning are performed. The top layers are modified to adapt the network to a binary classification task of detecting HTNR. The final fully connected layer is replaced with a two-node dense layer using a sigmoid activation function for binary classification (e.g., HTNR positive/negative).

The fine-tuning process is performed using a dataset of 1,000 fundus images specifically labeled for hypertensive retinopathy. Fine-tuning involves layer freezing, learning rate adjustment, and batch size and optimization. In layer freezing, the earlier layers of the CNN model, responsible for low- and mid-level feature extraction, are frozen. This ensures that the pretrained retinal features are retained, while only the final layers, which are responsible for hypertensive retinopathy detection, are trained. During learning rate adjustment, a lower learning rate (e.g., initially set to $10\text{-}5 10^{\{-5\}}$ 10-5) is used during fine-tuning to allow the model to slowly adjust the weights of the final layers without disrupting the pretrained weights of the earlier layers. For batch size and optimization, a batch size of 16 is used due to memory constraints. The Adam optimizer is employed with a learning rate scheduler that reduces the learning rate when validation loss plateaus.

In aspects, class balancing is employed. For example, if the dataset is slightly imbalanced (e.g., more negative cases than positive HTNR cases), the model applied class weighting during training, which gives more importance to the hypertensive retinopathy-positive cases, ensuring that the model learned to detect HTNR without bias toward the majority class.

The model may be trained for 50 epochs, with early stopping based on validation loss to prevent overfitting. The loss function used is generally binary cross-entropy. The training and validation sets are split in an 80:20 ratio, and performance is evaluated using the following metrics:

Aspects reviewed may comprise accuracy (e.g., overall correctness), precision (e.g., the proportion of correctly identified HTNR-positive cases out of all predicted positive cases), sensitivity (e.g., the ability of the model to identify all HTNR-positive cases), and/or Area Under the Receiver Operating Characteristic curve (AUC-ROC) (e.g., used to assess the model's performance across different classification thresholds).

The deep learning architecture includes a CNN having a specific configuration with a balance of depth, width, and resolution optimized for improved performance. The architecture employs MBConv blocks (e.g., inverted residuals and linear bottlenecks) as fundamental components, integrating squeeze-and-excitation blocks to model channel-wise relationships. The architecture, pre-trained on a large-scale image dataset, is fine-tuned on the cropped fundus images. The output layer is modified to classify images into four categories corresponding to no, mild, moderate, and severe Focal Narrowing, using a SoftMax activation function for probability distribution. The model is trained with a categorical cross-entropy loss function and the Adam optimizer, with a learning rate fine-tuned to 1e-5, over 50 epochs with batch size set to 16, employing data augmentation and dropout for regularization.

Figure 24:
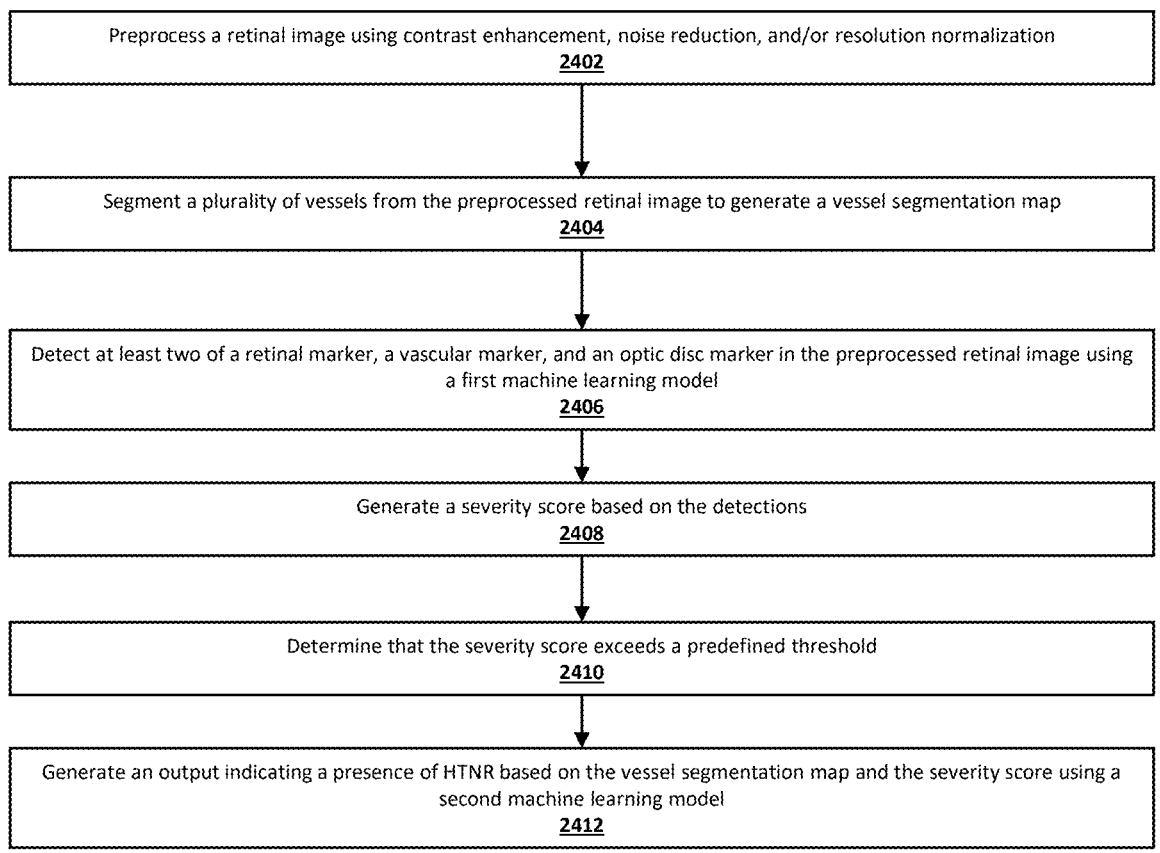
FIG. 24 is a flow diagram of an exemplary use of the CAC estimation system of FIG. 1, in accordance with aspects of the present disclosure.

With reference to FIG. 24, there is shown a method 2400 for an exemplary use of the HTNR detection system 100. Although the steps of method 2400 of FIG. 24 are shown in a particular order, the steps need not all be performed in the specified order, and certain steps can be performed in another order. For example, FIG. 24 will be described below, with a server (e.g., controller 200 of FIG. 2) performing the operations. In various aspects, the method 2400 of FIG. 24 may be performed all or in part by controller 200. In other aspects, the method 2400 of FIG. 24 may be performed all or in part by another device, for example, a mobile device and/or a client computer system. These and other variations are contemplated to be within the scope of the present disclosure.

Initially, at step 2402, the controller 200 causes the system 100 to preprocess a retinal image. Generally, the preprocessing includes using contrast enhancement, noise reduction, and/or resolution normalization. For example, the preprocessing module 400 may accept input including 512× 512 raw fundus images, then use contrast limited adaptive histogram equalization (CLAHE) to improve image contrast, such as highlighting blood vessels and/or use data augmentation techniques such as rotating the image 180 degrees to increase diversity in a training dataset. Noise reduction may be used to remove irrelevant noise, such as speckles in images. Resizing may resize the image to a standard resolution (e.g., 1024×1024) for consistency across a dataset.

Next, at step 2404, the controller 200 causes the system 100 to segment a plurality of vessels from the preprocessed retinal image to generate a vessel segmentation map. Generally, the vessel segmentation module 500 may accept an enhanced fundus image as input which, after processing, is output as segmented vessels includes a binary map, such as a segmentation grayscale where each pixel is classified as either "vessel" or "non-vessel." For example, using methods like thresholding, edge detection, or deep learning-based segmentation (e.g., U-Net, ResNet, or DenseNet), a neural network can automatically outline the major blood vessels within the retina. The vessel segmentation map highlights where the arteries and veins in the retina are located, crucial for detecting vascular diseases like HTNR.

Next, at step 2406, the controller 200 causes the system 100 to detect at least two of a retinal marker, a vascular marker, and an optic disc marker in the preprocessed retinal image. The retinal markers generally include the biomarkers detected by the biomarker detection module 1400, e.g., a microaneurysm, an exudate, a cotton wool spot, a hemorrhage, and/or a Hollenhorst plaque.

The vascular markers are generally detected by the arteriovenous nicking (AVN) detection module 700, the focal narrowing (FN) detection module 900, the AVN/FN detection module 1100, and/or the central arteriolar light reflex (CAR) 12, which may detect AVN, FN, CAR, central light reflex (CRR), arteriolar wall opacification, and/or generalized arteriolar narrowing. The optic disc marker is generally papilledema, which is detected by the papilledema detection module 2000.

Each detection module may include a machine learning (ML) model trained to detect specific markers in retinal images, which may perform probabilistic scoring. It will be understood that, while various types of MLs are discussed, the ML model may include any size and/or any type of ML model, which may be used to perform feature extraction. For example, a deep learning model might be trained to recognize markers such as cotton wool spots, microaneurysms, and/or exudates, all of which are associated with HTNR. These markers may be identified by the model based on their size, shape, and/or location within the retina. The detection modules may each include a transformer-based model(s) for enhanced feature extraction in complex cases. The detected markers may be validated against a ground truth dataset curated by ophthalmology experts.

Next, at step 2408, the controller 200 may cause the system 100 to generate a severity score based on the detections using a neural network. For example, the classification and decision module 2100 may integrate severity scores from the detection modules and, using a neural network, can output a probabilistic score (e.g., percentage between 0-1, such as 0.82) for each marker, which can then be thresholded to provide a definitive grading. The classification and decision module 2100 may employ a logistic model tree (LMT) classifier to integrate multiple HTNR markers into a final diagnostic decision (e.g., a severity score).

Next, at step 2410, the controller 200 may cause the system 100 to determine that the severity score exceeds a predefined threshold. For example, if the classification and decision module 2100 outputs a probabilistic score of 0.82 for the presence of HTNR, this score suggests the model is 92% confident that HTNR is present in the retinal image. The classification and decision module 2100 might then use a predefined threshold (e.g., 0.75) to decide if the condition is severe enough to warrant attention. If the severity score exceeds this threshold, the classification and decision module 2100 could flag the case as highly likely to have HTNR. Thus, the system 100 may use a combination of deep learning-based segmentation and threshold-based feature extraction to determine a presence of HTNR. In doing so, the classification and decision module 2100 may use the Wong-Mitchell, Keith-Wagener-Baker, and/or Scheie classification systems. In aspects, the classification and decision module 2100 and/or the HTNR detection system 100 as a whole may be include a network that is pretrained on a custom dataset containing 100,000 fundus images, generally annotated for ten different retinal conditions: diabetic retinopathy, glaucoma, cataract, age related macular degeneration, myopia, epiretinal membrane macular hole, macular edema choroidal neovascularization, and/or retinal vein occlusion.

At step 2412, the controller 200 may cause the system 100 to generate an output indicating a presence of HTNR based on the vessel segmentation map and the severity score using a second neural network. The output may be a text-based result (e.g., "HTNR detected, severity score: 8/10") or a visual output, such as a heatmap overlaid on the retinal image showing areas of concern. For example, a computer program may output visual results and/or produce a digital diagnostic report discussing results (e.g., an explainable AI module provides reasoning for each hypertensive retinopathy classification result) with confidence intervals for each detected HTNR marker. An additional neural network could be used to cross-check the initial diagnosis, ensuring the model is confident in diagnosing HTNR based on the vessel abnormalities and overall severity score.

In aspects, the HTNR detection system 100 may be integrated with an electronic health record (EHR) system for automated data storage and retrieval. The integration may allow for seamless transfer of patient information, including retinal images and diagnostic results, directly between the HTNR detection system 100 and the EHR. For example, a diagnostic report, along with associated metadata (e.g., severity score, detected markers, and vessel segmentation map), can be automatically stored in the EHR. This integration enables healthcare providers to access and review the results quickly and efficiently within the context of the patient's medical history. In another example, the HTNR detection system 100 may trigger notifications or alerts within the EHR when the probabilistic score exceeds a predefined threshold, prompting timely clinical intervention (e.g., in an application on a personal device). By automating data storage and retrieval, the integration of the HTNR detection system with the EHR system reduces the potential for human error, improves clinical workflow efficiency, and ensures that critical information is readily available for decision-making and follow-up care.

HTNR Detection Results

For external validation, a Kaggle HTNR dataset was used. The model demonstrated robust performance in detecting hypertensive retinopathy, with a sensitivity of 80.33% (95% CI: 68.16% to 89.40%) and a specificity of 83.43% (95% CI: 77.08% to 88.61%). This indicates that the model accurately identifies positive cases and effectively distinguishes negative cases. The positive predictive value (PPV) was 62.82% (95% CI: 54.23% to 70.67%), meaning that when the model predicted hypertensive retinopathy, it was correct about 63% of the time. The negative predictive value (NPV) was notably high at 92.41% (95% CI: 87.95% to 95.30%), showing that the model reliably ruled out hypertensive retinopathy in most negative predictions. Overall, the model achieved an accuracy of 82.63% (95% CI: 77.18% to 87.24%), highlighting its effectiveness in screening for hypertensive retinopathy.

| Statistic | Value | 95% CI |
| --- | --- | --- |
| Sensitivity | 80.33% | 68.16% to 89.40% |
| Specificity | 83.43% | 77.08% to 88.61% |
| Positive Predictive Value | 62.82% | 54.23% to 70.67% |
| Negative Predictive Value (*) | 92.41% | 87.95% to 95.30% |
| Accuracy (*) | 82.63% | 77.18% to 87.24% |

AVN and FAN Detection Results: The AVN model demonstrated high efficacy in detecting AV Nicking, with notable sensitivity and specificity. The positive and negative predictive values, along with the positive and negative likelihood ratios, underscored the model's diagnostic precision. However, it's important to note that the disease prevalence indicated in the dataset does not reflect general hypertensive retinopathy prevalence.

TABLE 1

Results of the AVN detection (mild or worse)

| Statistic | Value | 95% CI |
| --- | --- | --- |
| Sensitivity | 88.89% | 73.94% to 96.89% |
| Specificity | 93.75% | 84.76% to 98.27% |
| Positive Likelihood Ratio | 14.22 | 5.47 to 36.99 |
| Negative Likelihood Ratio | 0.12 | 0.05 to 0.30 |
| Disease prevalence (*) | 36.00% | 26.64% to 46.21% |
| Positive Predictive Value | 88.89% | 75.46% to 95.41% |
| Negative Predictive Value | 93.75% | 85.59% to 97.43% |
| Accuracy | 92.00% | 84.84% to 96.48% |

(*) Prevalence is only in the given dataset, hence should not be treated as general Like AVN detection, the focal narrowing detection showed strong sensitivity and specificity. The model's performance, indicated by its predictive values and likelihood ratios, highlights its potential utility in diagnosing hypertensive retinopathy through FN detection.

TABLE 2

Results of the FN detection (mild or worse)

| Statistic | Value | 95% CI |
| --- | --- | --- |
| Sensitivity | 83.78% | 67.99% to 93.81% |
| Specificity | 94.92% | 85.85% to 98.94% |
| Positive Likelihood Ratio | 16.48 | 5.42 to 50.08 |
| Negative Likelihood Ratio | 0.17 | 0.08 to 0.36 |
| Disease prevalence (*) | 38.54% | 28.78% to 49.03% |
| Positive Predictive Value | 91.18% | 77.27% to 96.91% |
| Negative Predictive Value | 90.32% | 81.74% to 95.11% |
| Accuracy | 90.62% | 82.95% to 95.62% |

(*) Prevalence is only in the given dataset, hence should not be treated as general HTRN disease prevalence When tested on an external dataset, the combined hypertensive retinopathy model exhibited excellent sensitivity and specificity. These results, particularly the positive and negative predictive values, demonstrate the model's robustness and reliability in diagnosing hypertensive retinopathy. It's crucial to consider that the disease prevalence in the external dataset might not be representative of the general population.

TABLE 3

Results on the external dataset:
28 positive, 50 normal
(not representative of the generalized target population)

| Statistic | Value | 95% CI |
| --- | --- | --- |
| Sensitivity | 92.86% | 76.50% to 99.12% |
| Specificity | 90.00% | 78.19% to 96.67% |
| Positive Likelihood Ratio | 9.29 | 4.02 to 21.46 |
| Negative Likelihood Ratio | 0.08 | 0.02 to 0.30 |
| Disease prevalence (*)(note) | 35.90% | 25.34% to 47.56% |
| Positive Predictive Value (*) | 83.87% | 69.23% to 92.32% |
| Negative Predictive Value (*) | 95.74% | 85.51% to 98.85% |
| Accuracy (*) | 91.03% | 82.38% to 96.32% |

(*) These values are dependent on disease prevalence. It is noted that disease prevalence should not be interpreted as that in the general population.

This study's findings suggest that AI-based models are highly effective in detecting hypertensive retinopathy features in fundus images, offering a promising tool for early diagnosis and management of this condition.

HTNR detection system 100 refers to various modules and/or ML models. It will be understood that various ML architecture alternatives, such as neural network architectures, may be employed by system 100. For example, system 100 may use a ResNet (residual network), which enables residual connections that help in training deep networks without vanishing gradients and/or are beneficial for extracting detailed features from high-resolution images. In another example, system 100 may use a DenseNet (dense convolutional network), which enables dense connections between layers, improving information flow and enabling feature reuse, which useful for capturing fine retinal details. In another example, system 100 may use VGG (visual geometry group networks) with deep layers, which enable simplicity and efficiency, especially in feature extraction for smaller datasets. In still another example, system 100 may use RegNet (regularization networks), which are flexibly designed for efficient scaling and regularization, allowing for better feature extraction with customizable architecture options.

Additional architectures for ML may include: multi-scale convolutions (e.g., to capture different levels of detail in images suitable for complex patterns in retinal images), depth-wise separable convolutions (e.g., ideal for fast processing in edge devices), compact architectures that achieves high-level accuracy with 50× fewer parameters (e.g., suitable for limited computing environments), replacing standard convolutions with depth wise separable convolutions (e.g., achieving high efficiency and detail extraction), Auto ML-generated architecture optimized for high performance with minimal computational cost (e.g., useful in high-dimensional medical imaging), scalable and efficient models balancing accuracy and/or efficiency (e.g., by scaling depth, width, and resolution), simple and relatively shallow networks (e.g., a good option for baseline models, especially when computational resources are limited), lightweight and optimized models for mobile devices (e.g., using pointwise group convolutions, suitable for real-time applications on constrained hardware), transformer-based architectures that process image patches as sequences, (e.g., capable of capturing long-range dependencies useful for more global image interpretations), adaptations of convolutional models including design choices from transformers (e.g., achieving competitive results in vision tasks), and architectures specifically designed for medical imaging with segmentation and/or adapted for feature extraction (e.g., encoder-decoder structure capturing spatial information). It is understood that alternative network architectures are contemplated and within the scope of this disclosure.

Various exemplary embodiments of the disclosure are discussed below. According to some embodiments of the present disclosure, methods and computer program products for predicting and detecting the onset of HTNR are provided. In various embodiments, a method of detecting HTNR is provided. At least one neural network model of a plurality of neural network models may be pre-trained using a small data classifier. The plurality of neural network models may be trained based on a plurality of indications of HTNR. A risk score associated with each of the plurality of indications may be simultaneously generated based on the trained plurality of neural network models. The risk score associated with each of the plurality of indications may be combined based on a classification model to produce a likelihood of HTNR. A determination of whether HTNR is present may be made based on the likelihood of HTNR.

Various exemplary embodiments of the HTNR detection system 100 are illustrated below.

In various embodiments, a system is provided including a computing node comprising a computer readable storage medium having program instructions embodied therewith. The program instructions are executable by a processor of the computing node to cause the processor to perform a method. At least one neural network model of a plurality of neural network models may be pre-trained using a small data classifier. The plurality of neural network models may be trained based on a plurality of indications of HTNR. A risk score associated with each of the plurality of indications may be simultaneously generated based on the trained plurality of neural network models. The risk score associated with each of the plurality of indications may be combined based on a classification model to produce a likelihood of HTNR. A determination of whether HTNR is present may be made based on the likelihood of HTNR.

In various embodiments, a computer program product for backing up and restoring a managed cluster of nodes is provided including a computer readable storage medium having program instructions embodied therewith. The program instructions are executable by a processor to cause the processor to perform a method. At least one neural network model of a plurality of neural network models may be pre-trained using a small data classifier. The plurality of neural network models may be trained based on a plurality of indications of HTNR. A risk score associated with each of the plurality of indications may be simultaneously generated based on the trained plurality of neural network models. The risk score associated with each of the plurality of indications may be combined based on a classification model to produce a likelihood of HTNR. A determination of whether glaucoma is present may be made based on the likelihood of HTNR.

In various embodiments, a risk score may be generated for each of multiple indications of HTNR, such as an artery-vein nicking/nipping (AVN), focal arteriolar narrowing (FAN), central light-reflex or central arteriolar light reflex (CR or CAR), microaneurysms (MA), and/or hard exudates. Soft exudates, cotton wool spots, hemorrhages, Hollen Horst Plaque and papilledema. Examples of AVN absent and present score may include binary AVN as HTNR vs. no HTNR, and a 3-class AVN score (such as mild, moderate and severe AVN) for HTNR and no HTNR probability score. Similarly, FAN absent, and present score may include binary FAN as HTNR vs. no HTNR, and a 3-class FAN score (such as mild, moderate and severe FAN) for HTNR and no HTNR probability score. And CAR absent and present score may include binary CAR as HTNR vs. no HTNR, and a 3-class CAR score (such as mild, moderate and severe CAR) for HTNR and no HTNR probability score. Detection of Papilledema may be achieved with a higher confidence using the Optimizing Small Datasets Problem-Domain-Specific Pre-Training (OSDP-DSPT) algorithm, described further below, as well as an independent papilledema measure to determine a risk score associated with Papilledema. The microaneurysms may be assessed via the OSDP-DSPT algorithm as well as an independent disc hemorrhage measure. Similar approaches may be taken for the assessment and computation of exudates, cotton wool spots and hemorrhages, Hollenhorst plaque. Each of the risk scores may be generated based on an output of a separate machine learning model, such as a deep learning model, a deep neural network, or the like, with the multiple indications as input to each of the deep learning models. A classification model, such as a logistic model tree (LMT) may be used to combine each of the risk scores to produce a probability/likelihood risk score of HTNR. This technique may achieve a substantially high accuracy for the detection of HTNR.

In various embodiments, the technique described herein may break down an HTNR screening task into multiple, such as three, individual problems in a type of divide and conquer approach. Each of the aforementioned models may learn the respective features that are relevant to HTNR independent of other features. For example, the features may include HTNR features such as MA, and papilledema versus fifteen different features of retinal pathologies such as drusen, peripapillary atrophy and disc hemorrhage, and the like. Such an approach may increase the accuracy of feature detection for whether HTNR is or will be present.

In various embodiments, the techniques described herein may divide a main problem into subproblems, each of which is associated with a machine learning model that may be pre-trained and trained. The output of each machine learning model may be combined using a classification model, such as an LMT, which may output value(s) used to determine whether HTNR is or will be present. In particular, the output of each model may be a prediction for a particular indication of HTNR. The classification model may learn from predictions from the output of each model. The classification model may provide a probability/likelihood risk score of HTNR. The risk score of HTNR may act as a binary classifier, for example by comparing the risk score to a predetermined or dynamically set threshold. The threshold may be set in a way that is balanced and/or a clinically useful sensitivity and specificity.

In various embodiments, an HTNR probability/likelihood risk score may be generated using an OSDP-DSPT algorithm and a Papilledema model (DHM). In various embodiments, Hollenhorst plaque may be detected using Open Supervised Device Protocol (OSDP) and/or OSDP-DSPT and a Hollenhorst plaque model to generate the HTNR probability/likelihood risk score.

In various embodiments, an AVN based HTNR probability/likelihood risk score may be generated using OSDP-DSPT. This may be combined with information regarding other indications of HTNR which may be generated separately. In various embodiments, an HTNR probability/likelihood risk score may be generated from either MA, or exudates, or cotton wool spots, or hemorrhage, or any of their possible combinations which may be analyzed by detecting them or segmenting them from the image or both.

In various embodiments, an automated detection and classification system for HTNR with multi-module analysis can be generated. The system implements an automated method to detect and classify hypertensive retinopathy severity by analyzing retinal fundus images through three specialized modules: vessel-based, optic-disc-based, and biomarkers-based analysis. The vessel-based module applies a modified U-Net architecture to segment retinal blood vessels, identifying parameters like vessel thickness and AV nicking. The optic-disc-based module uses an Xception network to localize and analyze the optic disc, and fining the papilledema, while the biomarkers-based module uses a CNN for grading other pathological markers like hemorrhages, microaneurysms, and exudates. Together, these modules integrate multi-pathological data to classify hypertensive retinopathy severity according to three scales: the Wong-Mitchell, Keith-Wagener-Baker, and Scheie classification systems, each evaluating disease progression based on a unique set of criteria.

In various embodiments, a vessel segmentation using enhanced U-Net for retinal image analysis can be generated. The vessel segmentation module employs a custom U-Net-based architecture optimized for segmenting retinal blood vessels. This method includes adaptive preprocessing of images to a standard size (e.g., 512×512 pixels) and the application of Contrast Limited Adaptive Histogram Equalization (CLAHE) to improve vessel visibility. The U-Net model, enhanced with batch normalization and dropout layers, applies a contracting path to capture feature context and an expanding path for detailed localization, achieving binary classification of vessel pixels. The segmentation output informs subsequent modules, allowing specific pathological changes, like vessel narrowing, to be identified with high accuracy. This segmentation approach is broadly applicable to medical imaging tasks involving vascular detection.

In various embodiments, a detection and severity grading of arteriovenous nicking using convolutional neural network (CNN) models can be generated. The system detects and grades arteriovenous nicking (AVN) by initially segmenting blood vessels, followed by cropping specific regions of interest (ROIs) in grayscale around vessel intersections. Each cropped ROI (e.g., 64×64 pixels) undergoes classification using a CNN model trained to identify four levels of AVN severity: no nicking, mild, moderate, and severe. The classification CNN comprises multiple convolutional and pooling layers with dropout for regularization, ultimately outputting a probability distribution over the four AVN severity categories. This approach enables efficient detection of vascular changes due to hypertension and can be adapted for other retinal conditions characterized by vessel intersection anomalies.

In various embodiments, a deep learning-based classification of focal narrowing in retinal blood vessels can be generated. The system employs a CNN architecture optimized for focal narrowing (FN) detection in retinal images. FN analysis begins with segmentation of blood vessels, followed by extraction of localized ROIs (e.g., 128×128 pixels) containing narrowed vessel regions. These regions are analyzed for changes in vessel diameter indicative of FN, and the CNN model scales the network's depth, width, and resolution based on fixed coefficients to improve diagnostic accuracy while maintaining efficiency. The final output classifies FN severity into no, mild, moderate, and severe categories, enhancing the identification of hypertension-related retinal changes.

In various embodiments, a multi-stage screening system for HTNR based on probability thresholds can be generated. This multi-stage diagnostic system evaluates hypertensive retinopathy by combining arteriovenous nicking and focal narrowing scores with other retinal biomarkers, such as hemorrhages and exudates. The system computes probability scores for each parameter and compares them against established thresholds to determine hypertensive retinopathy presence and severity. If any probability exceeds a threshold, the system flags the case for further clinical review. This threshold-based approach allows nuanced differentiation between normal and hypertensive retinopathy cases, ensuring high sensitivity and specificity in identifying early disease markers.

In various embodiments, an automated hemorrhage detection in retinal fundus images using a two-phase model can be generated. The hemorrhage detection module operates in two stages: segmentation and classification. First, a modified U-Net model isolates hemorrhages by preprocessing input images (512×512 pixels) with adaptive histogram equalization and Gaussian filtering to enhance contrast and reduce noise. The segmented hemorrhage regions are then classified into "No," "Mild," or "Severe" categories based on area and density characteristics using a compact CNN with ReLU activations and dropout layers for robustness. This dual-phase model improves hemorrhage detection accuracy and can generalize detecting other small, high-contrast structures in medical images.

In various embodiments, an automated microaneurysm detection and severity classification using segmentation and deep Learning can be generated. The system includes a dedicated module for detecting microaneurysms in retinal fundus images, using a two-step approach of segmentation and classification. Initially, the microaneurysm segmentation phase uses a U-Net model configured to segment small, circular structures indicative of microaneurysms. This model applies convolutional and pooling layers to process pre-enhanced retinal images, isolating regions with high contrast indicative of microaneurysm presence. The segmented areas are then processed by a classification model, such as a CNN, which assigns severity levels based on the number, size, and density of detected microaneurysms, categorizing cases as "No," "Mild," or "Severe." This dual-stage approach improves detection accuracy for microaneurysms, which are early indicators of retinal disease, making it suitable for use in other ophthalmic conditions characterized by small vascular lesions.

In various embodiments, exudate detection and grading through segmentation-based deep learning in retinal imaging can be generated. The system includes a module specifically designed to detect and grade exudates in retinal fundus images, employing a segmentation-first approach followed by classification. Exudate segmentation begins with a modified U-Net model that highlights high-intensity regions, which are characteristic of exudates, using preprocessing techniques like adaptive histogram equalization to enhance contrast. After segmentation, an CNN model classifies these exudate regions into "No," "Mild," or "Severe" severity levels based on size, spread, and distribution patterns. This two-phase approach not only improves detection accuracy for exudates but also allows clinicians to assess severity consistently, providing valuable insights into disease progression. The model's modular design can be adapted for other retinal conditions with similar high-intensity features, extending its utility beyond hypertensive retinopathy.

In various embodiments, cotton wool spot detection and grading through segmentation-based deep learning in retinal imaging can be generated. The cotton wool spots areas are segmented using the U-Net architecture and is adapted to emphasize the soft, fluffy appearance of cotton wool spots against the complex background of the retina, utilizing preprocessing techniques such as adaptive histogram equalization for enhanced contrast and Gaussian blurring to reduce image noise. This step ensures the distinct, fluffy characteristics of cotton wool spots are accurately captured. Following segmentation, a custom CNN classifier categorizes the spots based on their potential impact on visual function into "Absent," "Present-Mild," or "Present-Severe."

In various embodiments, Hollen Horst plaque detection and grading through segmentation-based deep learning in retinal imaging can be generated. The algorithm detects Hollenhorst plaques in fundus images through a two-step process of segmentation and classification. The segmentation utilizes a U-Net architecture, refined for medical imagery, enhanced by adaptive histogram equalization and Gaussian blurring for contrast and noise improvement, aimed at highlighting the characteristic bright, cholesterol-rich plaques. Subsequent classification is performed by a tailored CNN employing ReLU activations and optimized through Adam, to categorize plaques based on their implications for retinal health into "Absent," "Mild," or "Severe". This classification considers plaque number, location, and potential blood flow obstruction, leveraging data augmentation for robust generalization. The SoftMax function finalizes the process and produces an output.

In various embodiments, a papilledema detection using optic disc localization and machine learning based classification can be generated. The papilledema detection system consists of two modules: optic disc localization and papilledema classification. The Xception network initially identifies and crops the optic disc region, focusing subsequent analysis on the standardized square or rectangular shaped smaller region of pixels of cropped area. CNN and/or deep neural network model then classifies the optic disc image for signs of papilledema based on characteristic swelling and the standard papilledema detection protocol. This two-step approach minimizes data processing requirements and improves papilledema detection reliability, allowing for scalable deployment in clinical settings where efficient optic disc-focused analysis is required.

In various embodiments, classification of HTNR as absent or present (i.e., HTNR yes/no) in the image based on ten different prominent retinal diseases can be generated.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi™, Fortran®, Java®, JavaScript®, machine code, operating system command languages, Pascal®, Perl®, PL1, scripting languages, Visual Basic, metalanguages which themselves specify programs, and all first, second, third, fourth, fifth, or further generation computer languages. Also included are database and other data schemas, and any other meta-languages. No distinction is made between languages that are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above are also intended to be within the scope of the disclosure.

What is claimed is:

1. A system for hypertensive retinopathy (HTNR) detection, comprising:
a processor; and
a memory, including instructions stored thereon, which when executed by the processor, cause the system to:
preprocess a retinal image using at least one of contrast enhancement, noise reduction, or resolution normalization;
segment a plurality of vessels from the preprocessed retinal image to generate a vessel segmentation map;
detect at least two of a retinal marker, a vascular marker, and an optic disc marker in the preprocessed retinal image using a first machine learning model;
generate a preliminary score for each detection using a respective neural network of the first machine learning model, each respective neural network independently trained to detect a corresponding marker, wherein the preliminary score is based on a probabilistic scoring of the detection using a transformer-based model for enhanced feature extraction;
integrate the preliminary scores to generate a severity score based on the detections;
determine that the severity score exceeds a predefined threshold; and
generate an output indicating a presence of HTNR based on the vessel segmentation map and the severity score using a second machine learning model.

2. The system of claim 1, wherein the retinal marker indicates at least one of a microaneurysm, an exudate, a cotton wool spot, a hemorrhage, or a Hollenhorst plaque.

3. The system of claim 1, wherein the instructions, when executed by the processor, further cause the system to:
receive the retinal image from a screening device, wherein the retinal image includes a fundus image of a patient.

4. The system of claim 1, wherein preprocessing the retinal image includes applying contrast-limited adaptive histogram equalization (CLAHE) and Gaussian filtering.

5. The system of claim 1, wherein segmenting the plurality of vessels from the preprocessed retinal image includes using a convolutional neural network (CNN) with contracting and expanding paths for segmentation.

6. The system of claim 5, wherein the CNN includes a modified U-Net architecture trained on annotated retinal fundus images, the modified U-Net architecture configured to utilize a binary cross-entropy function and a Dice loss function to mitigate class imbalances, thereby enhancing a segmentation accuracy of the CNN.

7. The system of claim 1, wherein the instructions, when executed by the processor, further cause the system to:
extract a region of interest (ROI) from the vessel segmentation map; and
detect a presence of the vascular marker in the extracted ROI using the first machine learning model, the vascular marker indicating at least one of arteriovenous nicking (AVN), focal narrowing (FN), central arteriolar light reflex (CAR), central light reflex (CRR), or arteriolar wall opacification.

8. The system of claim 7, wherein the instructions, when executed by the processor, further cause the system to:
identify an optic disc region in the preprocessed retinal image; and
detect a presence of the optic disc marker in the optic disc region using the first machine learning model, the optic disc-marker indicating papilledema.

9. The system of claim 1, wherein the instructions, when executed by the processor, further cause the system to:
pretrain at least one of the first machine learning model or the second machine learning model using a dataset including fundus images associated with at least ten retinal conditions.

10. The system of claim 1, further comprising an electronic health record (EHR) system, the EHR system configured to output an alert to a clinician device indicating the presence of HTNR.

11. The system of claim 1, wherein each respective neural network is configured to uniformly scale a width, a depth, and a resolution of the neural network using fixed scaling coefficients.

12. The system of claim 1, wherein the preliminary scores are integrated using a logistic model tree (LMT) classifier trained on data associated with HTNR.

13. A method for hypertensive retinopathy (HTNR) detection, comprising:
preprocessing a retinal image using at least one of contrast enhancement, noise reduction, or resolution normalization;
segmenting a plurality of vessels from the preprocessed retinal image to generate a vessel segmentation map;
detecting at least two of a retinal marker, a vascular marker, and an optic disc marker in the preprocessed retinal image using a first machine learning model;
generating a preliminary score for each detection using a respective neural network of the first machine learning model independently trained to detect the corresponding marker, wherein the preliminary score is based on a probabilistic scoring of the detection using a transformer-based model for enhanced feature extraction;
integrating the preliminary scores to generate a severity score based on the detections;
determining that the severity score exceeds a predefined threshold; and
generating an output indicating a presence of HTNR based on the vessel segmentation map and the severity score using a second machine learning model.

14. The method of claim 13, wherein the retinal marker indicates at least one of a microaneurysm, an exudate, a cotton wool spot, a hemorrhage, or a Hollenhorst plaque.

15. The method of claim 13, wherein preprocessing the retinal image includes applying contrast-limited adaptive histogram equalization (CLAHE) and Gaussian filtering.

16. The method of claim 13, wherein segmenting the plurality of vessels from the preprocessed retinal image includes using a convolutional neural network (CNN) with contracting and expanding paths for segmentation.

17. The method of claim 16, wherein the CNN includes a modified U-Net architecture trained on annotated retinal fundus images, the modified U-Net architecture configured to utilize a binary cross-entropy function and a Dice loss function to mitigate class imbalances, thereby enhancing a segmentation accuracy of the CNN.

18. The method of claim 13, further comprising:
extracting a region of interest (ROI) from the vessel segmentation map; and
detecting a presence of the vascular marker in the extracted ROI using the first machine learning model, the vascular marker indicating at least one of arteriovenous nicking (AVN), focal narrowing (FN), central arteriolar light reflex (CAR), central light reflex (CRR), or arteriolar wall opacification.

19. The method of claim 18, further comprising:
identifying an optic disc region in the preprocessed retinal image; and
detecting a presence of the optic disc marker in the optic disc region using the first machine learning model, the optic disc-marker indicating papilledema.

20. A non-transitory computer readable storage medium including instructions that, when executed by a computer, cause the computer to perform a method for hypertensive retinopathy (HTNR) detection, the method comprising:
preprocessing a retinal image using at least one of contrast enhancement, noise reduction, or resolution normalization;
segmenting a plurality of vessels from the preprocessed retinal image to generate a vessel segmentation map;
detecting at least two of a retinal marker, a vascular marker, and an optic disc marker in the preprocessed retinal image using a first machine learning model;
generating a preliminary score for each detection using a respective neural network of the first machine learning model independently trained to detect the corresponding marker, wherein the preliminary score is based on a probabilistic scoring of the detection using a transformer-based model for enhanced feature extraction;
integrating the preliminary scores to generate a severity score based on the detections;
determining that the severity score exceeds a predefined threshold; and generating an output indicating a presence of HTNR based on the vessel segmentation map and the severity score using a second machine learning model.

* * * * *